United States Patent [19]
Wysocki et al.

[11] Patent Number: 5,189,676
[45] Date of Patent: Feb. 23, 1993

[54] BROADBAND LASER SOURCE

[75] Inventors: Paul F. Wysocki, Stanford; Michel J. F. Digonnet, Palo Alto; Byoung Y. Kim, Menlo Park, all of Calif.

[73] Assignee: The Board of Trustees of the Leland Stanford Junior University, Stanford, Calif.

[21] Appl. No.: 403,703

[22] Filed: Sep. 6, 1989

[51] Int. Cl.⁵ ............................................. H01S 3/30
[52] U.S. Cl. ................................... 372/6; 372/23; 372/24; 372/28; 356/350
[58] Field of Search ............... 372/6, 23, 24, 28, 32; 356/345, 350

[56] References Cited

U.S. PATENT DOCUMENTS

| | | | |
|---|---|---|---|
| 4,386,822 | 6/1983 | Bergh | 350/96.15 |
| 4,410,275 | 10/1983 | Shaw et al. | 356/350 |
| 4,456,377 | 6/1984 | Shaw et al. | 356/350 |
| 4,493,528 | 1/1985 | Shaw et al. | 350/96.15 |
| 4,529,312 | 7/1985 | Pavlath et al. | 356/350 |
| 4,536,058 | 8/1985 | Shaw et al. | 350/320 |
| 4,564,262 | 1/1986 | Shaw | 350/96.15 |
| 4,586,184 | 4/1986 | Hess | 372/28 |
| 4,601,541 | 7/1986 | Shaw et al. | 350/320 |
| 4,634,282 | 1/1987 | Shaw et al. | 356/350 |
| 4,637,025 | 1/1987 | Snitzer et al. | 372/1 |
| 4,637,722 | 1/1987 | Kim | 356/350 |
| 4,697,888 | 10/1987 | Schmadel, Jr. et al. | 350/358 |
| 4,773,759 | 9/1988 | Bergh et al. | 356/350 |
| 4,779,975 | 10/1988 | Kim | 356/345 |
| 4,859,016 | 8/1989 | Shaw et al. | 350/96.15 |
| 4,890,922 | 1/1990 | Wilson | 356/350 |

FOREIGN PATENT DOCUMENTS 2176364 12/1986 United Kingdom .

OTHER PUBLICATIONS

K. Bohm, P. Marten, K. Petermann, E. Weidel, and R. Ulrich, "Low-Drift Fibre Gyro Using a Superluminescent Diode," *Electronics Letters*, vol. 17, No. 10, May 14, 1981, pp. 352-353.

P. F. Wysocki, M. J. F. Digonnet, and B. Y. Kim, "Spectral Characteristics of High-Power 1.5 μm Broad-Band Superluminescent Fiber Sources," *IEEE Photonics Technology Letters*, vol. 2, No. 3, Mar. 1990, pp. 178-180.

G. A. Coquin and K. W. Cheung, "Electronically Tunable External-Cavity Semiconductor Laser," *Electronics Letters*, vol. 24, No. 10, May 12, 1988, pp. 599-600.

P. F. Wysocki, M. J. F. Digonnet, and B. Y. Kim, "Electronically Tunable, 1.55 μm Erbium-Doped Fiber Laser," *Optics Letters*, vol. 15, No. 5, Mar. 1, 1990, pp. 273-275.

P. F. Wysocki et al., "Broad-Spectrum, Wavelength-Swept, Erbium-Doped Fiber Laser at 1.55 micron," *Optics Letters*, vol. 15, No. 16, Aug. 15, 1990, pp. 879-881.

L. Reekie et al., "Diode Laser-Pumped Operation of an $Er^{3+}$-Doped Single-Mode Fibre Laser,", *Electronics Letters*, Sep. 24, 1987, vol. 23, No. 20, pp. 1076-1077.

(List continued on next page.)

*Primary Examiner*—Frank Gonzalez
*Attorney, Agent, or Firm*—Knobbe, Martens, Olson & Bear

[57] ABSTRACT

A laser source comprises an optical fiber doped with a homogeneously broadened lasing medium, preferably with Erbium, pumped by a laser pump source and an intracavity acousto-optic modulator. When the acousto-optic modulator is driven by a variable frequency source, the Erbium fluorescence line emitted by the Erbium-doped optical fiber can be electronically tuned. In another embodiment, an electronic sweep waveform is used to frequency modulate the acoustic signal produced by the acousto-optic modulator. Without the low-rate frequency modulation, Erbium in a silica optical fiber is a mostly homogeneously broadened gain medium with a narrow laser linewidth. When measured on a long time scale, low-rate frequency modulation provides a broader spectral width, on the order of 19 nm, which makes such a source on an ideal source for certain optical applications such as fiber optic gyroscopes.

39 Claims, 16 Drawing Sheets

OTHER PUBLICATIONS

C. A. Millar, et al., "Low-Threshold cw Operation of an Erbium-Doped Fibre Laser Pumped at 807 nm Wavelength," *Electronics Letters*, Jul. 30, 1987, vol. 23, No. 16, pp. 865-866.

L. Reekie, et al., "Tunable Single-Mode Fiber Lasers," *Journal of Lightwave Technology*, vol. LT-4, No. 7, Jul. 1985, pp. 956-959.

R. J. Mears, et al., "Neodymium-Doped Silica Single-Mode Fiber Lasers," *Electronics Letters*, vol. 21, No. 17, Aug. 15, 1985, pp. 739-740.

C. A. Miller, et al., "Tunable Fiber Laser," *Technical Digest of Conferences on Lasers and Electrooptics*, Paper WD2, Apr. 29, 1987.

R. J. Mears, et al., "High Power Tunable Erbium-Doped Fiber Laser Operating at 1550 nm," *Technical Digest of Conferences on Lasers and Electrooptics*, Paper WD3, Apr. 29, 1987.

R. J. Mears, et al., "Low-Threshold Tunable CW and Q-Switched Fibre Laser Operating at 1.55 microns," *Electronics Letters*, vol. 22, No. 3, pp. 159-160, 1986.

F. V. Kowalski, et al., "Optical Pulse Generation With a Frequency Shifted Feedback Laser," *Applied Physics Letters*, vol. 53, No. 9, pp. 734-736, Aug. 29, 1988.

P. L. Scrivener, et al., "Narrow Linewidth Tunable Operation of $Er^{3+}$-Doped Single-Mode Fibre Laser," *Electronics Letters*, vol. 25, No. 8, pp. 549-550, Apr. 13, 1989.

W. K. Burns, et al., "Fiber-Optic Gyroscopes with Broad-Band Sources," *Journal of Lightwave Technology*, vol. LT-1, No. 1, pp. 98-105, Mar. 1983.

D. J. Taylor, et al., "Electronic Tuning of a Dye Laser Using the Acousto-Optic Filter," *Applied Physics Letters*, vol. 19, No. 8, pp. 269-271, Oct. 15, 1971.

W. Streifer, et al., "Analysis of a Dye Laser Tuned by Acousto-Optic Filter," *Applied Physics Letters*, No. 17, pp. 335-337, Oct. 15, 1970.

P. Saltz, et al., "Transient Analysis of an Electronically Tunable Dye Laser-Part I: Simulation Study," *IEEE Journal of Quantum Electronics*, vol. QE-8 No. 12, pp. 893-899, Dec. 1972.

W. Streifer, et al., "Transient Analysis of an Electronically Tunable Dye Laser-Part II:: Analytic Study," *IEEE Journal of Quantum Electronics*, vol. QE-9, No. 6, pp. 563-569, Jun. 1973.

D. J. Taylor, "Electronically Tunable Lasers," Dissertation Submitted to the Department of Electrical Engineeing of Stanford University, Dec. 1972.

R. J. Mears, "High-Gain Rare Earth Doped Fiber Amplifier at 1.54 $\mu m$"; Technical Digest, Optical Fiber Communication Conference, Sixth International Conference on Integrated Optics and Optical Fiber Communication, Paper W/2 (1987).

M. S. O'Sullivan, et al., "High-Power Narrow-Linewidth $Er^{3+}$-Fiber Laser." *Optics Letters*, vol. 14, No. 9, pp. 438-440, May 1989.

Emmanuel Desurvire, et al., "Amplification of Spontaneous Emission in Erbium-Doped Single-Mode, Fibers," *IEEE Journal of Lightwave Technology*, vol. 7, No. 5, May 1989.

S. E. Harris, et al., "Electronically Tunable Acousto-Optic Filter," *Applied Physics Letters*, vol. 15, No. 10, pp. 325-326, Nov. 15, 1969.

G. Coquin, et al, "Single and Multiple-Wavelength Operation of Acoustooptically Tuned Semiconductor Lasers at 1.3 microns," *IEEE Journal of Quantum Electronics*, vol. 25, No. 6, Jun. 1989, pp. 1575-1579.

F. V. Kowalski, et al, "Broadband Continuous-Wave Laser," *Optics Letters*, vol. 13, No. 8, pp. 622-624, Aug. 1988.

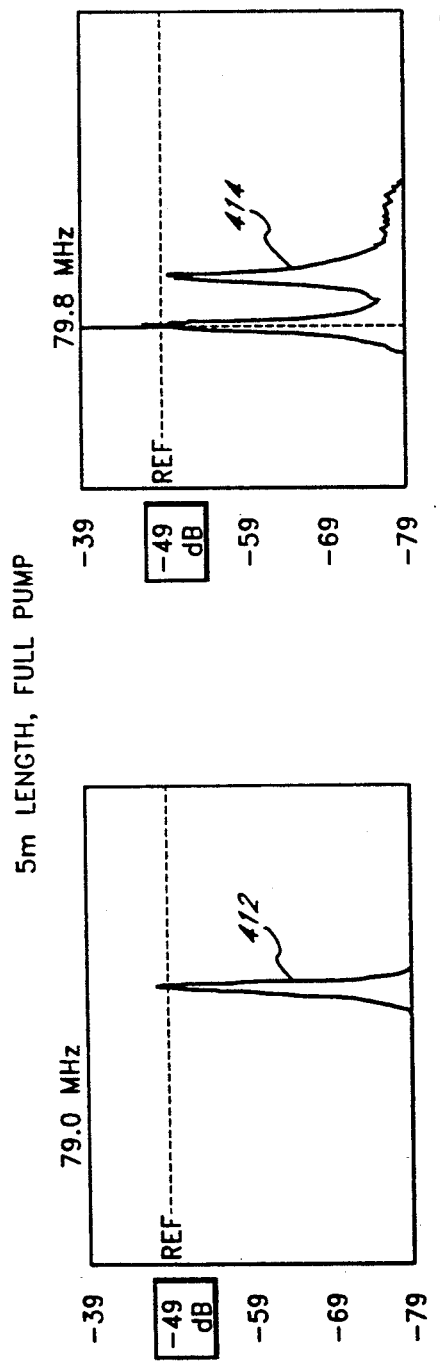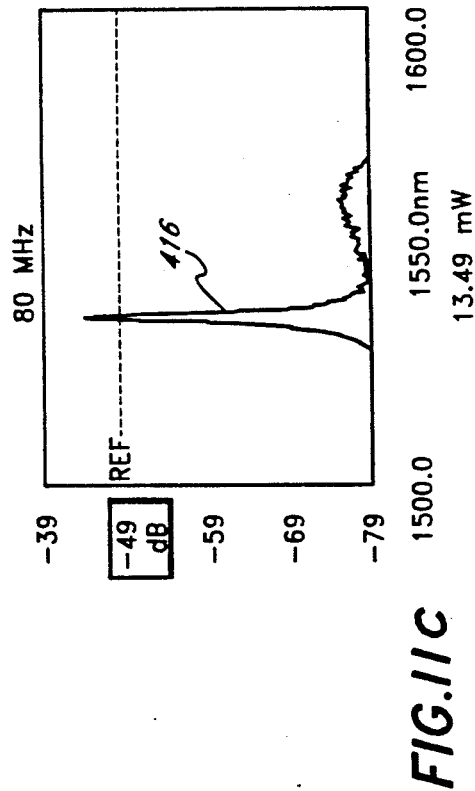
FIG.11a
FIG.11b
FIG.11c

BROADBAND LASER SOURCE

BACKGROUND OF THE INVENTION

The present invention is in the field of lasers, and more particularly, in the field of lasers in which the lasing medium is an optical fiber which is pumped with a pump optical signal to generate an output signal that is detected by a detector.

Optical fibers are being used for an increasing number of applications. One such application is an optical fiber rotation sensor comprising a loop of optical fiber into which two light signals are introduced and caused to counterpropagate around the optical loop. Such rotation sensors are described, for example, in U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. For such rotation sensors and for other optical fiber applications, it is desirable to have a stable well-controlled light source.

Prior art lasers typically concentrate the optical energy output from a laser in a very narrow band of optical wavelengths and have a relatively long temporal coherence length. In addition, some lasers are tunable over a range of wavelengths. For example, L. Reekie, et al., "Diode Laser-Pumped Operation of an $Er^{3+}$-doped single-mode fibre laser,", *Electronics Letters*, Sep. 24, 1987, Vol. 23, No. 20, pp. 1076–1077, which reports on extending the tuning range of an Erbium-doped fiber by varying the fiber length. In C. A. Millar, et al., "Low-Threshold cw Operation of an Erbium-Doped Fibre Laser Pumped at 807 nm Wavelength," *Electronics Letters*, Jul. 30, 1987, Vol. 23, No. 16, pp. 865–866, a low-threshold Erbium-doped optical fiber laser is described that has a linewidth of about 1 nm FWHM (Full Width at Half Maximum). In Laurence Reekie, et al., "Tunable Single-Mode Fiber Lasers," *Journal of Lightwave Technology*, Vol. LT-4, No. 7, July 1985, pp. 956–959, the tuning characteristics of a $Nd^{3+}$-doped single-mode fiber laser and the tuning characteristics of an $Er^{3+}$-doped single-mode fiber laser are described. In R. J. Mears, et al., "Neodymium-Doped Silica Single-Mode Fibre Lasers," *Electronics Letters*, Vol. 21, No. 17, Aug. 15, 1985, pp. 739–740, a dye-laser pumped fiber ring-cavity laser having a FWHM linewidth of 2 nm at a wavelength of 1078 nm is described. In David N. Payne, "Special Fibers and their uses," *OFC/IOOC '87*, Reno, Nev., Jan. 21, 1987, Invited Paper WI1, the use of rare-earth and transition-metal-doped single-mode fibers in very long (300 meters) lasers that are tunable over a range of 80 nm is discussed. In C. A. Millar, et al., "Tunable Fiber Laser," *Technical Digest of Conferences on Lasers and Electrooptics*, Paper WD2, Apr. 29, 1987, a $Nd^{3+}$-doped $Ge/P_2O_5$ silica single-mode fiber is tuned by incorporating a broadband dielectric mirror in the laser cavity through which the fiber is pumped using an Ar-ion laser at a wavelength corresponding to a strong absorption band of Nd. The output consists of a dominant line of approximately 1 nm width (FWHM) centered around 1067.5 nm, corresponding to the maximum reflectivity of the fiber mirror. In R. J. Mears, et al., "High Power Tunable Erbium-Doped Fiber Laser Operating at 1550 nm," *Technical Digest of Conferences on Lasers and Electrooptics*, Paper WD3, Apr. 29, 1987, a CW Q-switched fiber Erbium-doped fiber laser is described which is tunable about the wavelength of 1550 nm using a holographic grating. An acousto-optic modulator is inserted into the laser cavity to Q-switch the laser. In R. J. Mears, et al., "Low-Threshold Tunable CW and Q-Switched Fibre Laser Operating at 1.55 microns," *Electronics Letters*, Volume 22, Number 3, pp. 159–160, 1986, an intracavity objective is used to collimate light through an acousto-optic modulator onto a holographic grating. The fiber laser is tuned by varying the angle of the diffraction grating. Q-switching is effected by operating the acousto-optic modulator. In F. V. Kowalski, et al., "Optical Pulse Generation With a Frequency Shifted Feedback Laser," *Applied Physics Letters*, Volume 53, Number 9, pp. 734–736, Aug. 29, 1988, optical pulses are also generated using an acousto-optic modulator that shifts the frequency of the light inside the laser cavity of a dye laser. Wavelength tunable operation of an Erbium-doped fiber laser has also been demonstrated using a tunable ring resonator configuration as described in P. L. Scrivener, et al., "Narrow Linewidth Tunable Operation of $Er^{3+}$-Doped Single-Mode Fibre Laser," *Electronics Letters*, Volume 25, Number 8, pp. 549–550, Apr. 13, 1989. All of the above articles are hereby incorporated by reference herein.

For some applications, such as certain optical fiber rotation sensors, a high power broadband optical energy source having a short temporal coherence length and no longitudinal mode structure at longer wavelengths is desirable. It has been demonstrated that using a broadband optical energy source in an optical fiber rotation sensor, for example, reduces phase errors caused by the Kerr effect. A broadband optical signal can also be advantageously used to reduce phase errors in the combined optical signal from the loop of the rotation sensor caused by coherent backscattering (i.e., Rayleigh backscattering) and by polarization cross-coupling in the loop. See, for example, U.S. Pat. No. 4,773,759; U.S. patent application Ser. No. 488,732, filed on Apr. 26, 1983; (now abandoned) and U.S. patent application Ser. No. 909,741, filed on Sep. 19, 1986, now U.S. Pat. No. 4,881,817 issued November 1989; all of which are assigned to the assignee of the present application. These patents and patent applications are hereby incorporated by reference herein. A theoretical analysis regarding the broadband source requirement for fiber gyroscopes can be found in W. K. Burns, et al., "Fiber-Optic Gyroscopes with Broad-Band Sources," *Journal of Lightwave Technology*, Volume LT-1, Number 1, pp. 98–105, March 1983. This article is hereby incorporated by reference herein. Optical fiber rotation sensors also require highly stable center wavelengths with little thermal drift. A rotation sensor source must also have the ability to couple high power into the rotation sensor without creating large noise components (high signal/-noise ratio). Finally, an ideal rotation sensor source preferably operates in higher wavelength region of the output spectrum of the source in order to reduce any radiation effects.

Such broadband optical sources include, for example, superluminescent light emitting diodes, and the like. An exemplary superluminescent diode has a relatively broad optical linewidth (e.g. approximately 15 nm) at the optical wavelengths in the range of 800 to 850 nm, for example. However, for a given power input, exemplary superluminescent diodes may not provide an adequate amount of optical energy when compared to a laser, for example. More importantly, superluminescent diodes cannot be easily coupled to certain optical devices such as gyroscopes as the light emitted by superluminescent diodes is highly divergent. On the other hand, resonant cavity lasers typically provide adequate amounts of power but have a relatively narrow linewidth (e.g., less than 5 nm). Furthermore, lasers can be easily coupled to fiber optic gyroscopes. It is desirable to obtain the relatively high output and the coupling capacity of a laser while obtaining the relatively wide linewidths heretofore unobtainable with a resonant cavity laser. Furthermore, it is known that the temperature stability of the emission wavelength of a typical superluminescent diode is not satisfactory for numerous applications. It is also desirable that the emission wavelength be stable over a wide temperature range.

More recently, U.S. Pat. No. 4,637,025 to Snitzer, et al., describes a superradiant light source that includes an optical fiber having a core doped with a selected active laser material such as Neodymium.

U.S. patent application Ser. No. 281,088, filed on Dec. 7, 1988 and now U.S. Pat. No. 4,938,556 issued on Jul. 3, 1990, discloses a superfluorescent broadband fiber laser source comprising a fiber doped with laser material coupling to a multiplexing coupler. This application is assigned to the assignee of the present application. Such a superfluorescent source has good output power and easily couples to an optical fiber rotation sensor. It does not have longitudinal cavity modes and shows good thermal stability. Its spectrum is much broader than a resonant laser source. The above patent and patent application are hereby incorporated by reference herein.

Superfluorescent sources; however, require relatively high pump power, tend to lase as the result of reflections from lenses or other fiber ends causing narrowed spectrum and coherence. Furthermore, a special narrowing of the spectrum occurs as the result of selective amplification of peak frequencies at high powers in some materials (such as Erbium). Finally, the design of a superfluorescent source requires careful consideration of the variation of the output spectrum as a function of fiber length and output power.

One skilled in the art will recognize that the use of superfluorescence in an optical fiber light source will not provide an optical signal output intensity as high as can be obtained by a resonant cavity laser in which the oscillating light induces further emissions of light at the output wavelength. However, it has been previously understood that the use of a resonant cavity laser will produce an optical output signal having an undesirably narrow spectrum, thereby making resonant cavity lasers disadvantageous for use as broadband light sources.

U.S. patent application Ser. No. 176,739, filed on Apr. 1, 1988 (now abandoned), describes a broadband light source which uses an optical fiber doped with a lasing material such as Neodymium. This application is assigned to the assignee of the present application and is hereby incorporated by reference herein. The optical fiber is pumped with a pump optical signal having a pump wavelength selected to cause spontaneous emission of an optical signal at a second wavelength different from the pump wavelength. The wavelength of the pump optical signal is selected to be outside the pump variable tuning range of the Neodymium-doped optical fiber (i.e., the range of pump wavelengths which stimulate emitted wavelengths having an average wavelength with a generally one-to-one correspondence to the pump wavelength). Pumping with a pump signal outside the pump variable tuning ranges causes the emitted light to have a broad spectral envelope of longitudinal modes having emission wavelengths corresponding to substantially all the pump variable tuning range.

In recent years, Erbium-doped fiber lasers have received increasing attention as possible laser source and for amplification purposes in the low loss fiber communication window at 1500 nm. It is possible to obtain a high gain when the Erbium dopant is properly doped into the fiber, typically a silica fiber. The light emitted by Erbium-doped fibers easily couples into other fibers with similar mode sizes. An Erbium-doped fiber is also thermally relatively stable. Additionally, Erbium-doped fibers emit higher wavelength light than Neodymium-doped fibers, which makes them less sensitive to radiation induced loss mechanisms. Unfortunately, Erbium in silica is a mostly homogeneously broadened transition so that operation as a resonant laser produces a narrow linewidth measured at around 0.23 nm to 2 nm for either line of the spectrum. When operated as a high power, nonresonant, amplified spontaneous emission source, the Erbium fluorescence line is produced at longer wavelengths and has a short temporal coherence length and no longitudinal mode structure. This line seemingly meets the requirements imposed by certain optical fiber applications such as rotation sensors. The fluorescence spectrum of Erbium exhibits two narrow peaks at 1530 nm and between 1550 nm and 1560 nm. Near the 1530 nm peak, the linewidth is in the range of 4–5 nm. The narrowing of the fluorescence spectrum with increased input pump power indicates a mostly homogeneously broadened transition. For shorter lengths of the fiber, the 1530 nm peak is dominant. However, for longer lengths of the fiber, the 1550–1560 nm peak becomes dominant and has a wider linewidth on the order of 10–15 nm. Although such a source has a much broader spectrum than the resonant structure, it has limited power capabilities. These narrow peaks are inadequate in certain optical applications such as rotation sensors that require broader bandwidths in the range over 20 nm.

Recently, the transition of Erbium-doped fibers near 1550 and 1530 nm has been tuned by incorporating a rotatable grating or a grating with rotatable mirror to provide angle tuning capabilities. Electronic tuning of such a source is however preferable because it facilitates an all electronic laser wavelength control system with increased flexibility. As mentioned above, wavelength tunable operation of an Erbium-doped fiber laser has also been demonstrated using a tunable ring resonator configuration as described in the aforementioned Scrivener reference.

Electronic tuning has been implemented by means of an acousto-optic modulator. Electronic wavelength tuning was first demonstrated in an inhomogeneously broadened dye laser. In an article by D. J. Taylor, et al., "Electronic Tuning of a Dye Laser Using the Acousto-Optic Filter," *Applied Physics Letters*, Volume 19, Number 8, Oct. 15, 1971, there is described a dye laser which is electronically tunable over 780 Angström by inserting an acousto-optic filter into the dye laser cavity. This article is hereby incorporated by reference herein. When feeding back the frequency shifted deflected beam of the intracavity Bragg cell, the usual cavity longitudinal modes no longer exist but are replaced by frequency chirped modes. The acousto-optic filter causes the frequency of the light deflected by the Bragg cell to shift by twice the acoustic frequency in a round trip and so the usual laser resonance condition is not satisfied. According to the aforementioned Taylor reference, two modes of operation, however, can be distinguished, depending on various parameter values. In the first case, the dye saturates and the output is laserlike, whereas in the second case, there is amplified spontaneous emission (also referred to as superfluorescence). A theoretical analysis of the tunability of a dye laser tuned by acousto-optic filter can be found in W. Streifer, et al., "Analysis of a Dye Laser Tuned by Acousto-Optic Filter,", *Applied Physics Letters*, Number 17, pp. 335–337, Oct. 15, 1970, in P. Saltz, et al., "Transient Analysis of an Electronically Tunable Dye Laser—Part I: Simulation Study," *IEEE Journal of Quantum Electronics*, Volume QE-8, Number 12, pp. 893–899, December 1972, and in W. Streifer, et al., "Transient Analysis of an Electronically Tunable Dye Laser—Part II: Analytic Study," *IEEE Journal of Quantum Electronics*, Vol. QE-9, Number 6, pp. 563–569, June 1973. A thorough review of electronically tunable lasers can also be found in D. J. Taylor, "Electronically Tunable Lasers," Dissertation submitted to the Department of Electrical Engineering of Stanford University, December 1972. These articles are hereby incorporated by reference herein.

There is therefore the need for a high power broadband light source with short temporal coherence lengths and no longitudinal mode structure, having one or more stable high center wavelengths with little thermal drift which preferably uses an optical fiber structure. The present invention advantageously uses an intracavity frequency-modulated acousto-optic modulator to produce a broadband light source from a narrow-lined laser medium.

SUMMARY OF THE INVENTION

According to a first aspect of the present invention, there is disclosed a laser source comprising a cavity having a lasing medium which emits output radiation in an emission spectrum in response to application of pump energy to the lasing medium; a frequency modulator in the cavity, the frequency modulator further comprising a frequency shifter for shifting the frequency of the output radiation by a predetermined frequency and a frequency sweeper for modulating the frequency shifter.

The laser source of the present invention preferably comprises a source of pump energy for producing the pump light. This source of pump energy may be a laser diode. The lasing medium advantageously comprises a single-mode fiber doped with lasing material. This lasing medium may include a homogeneously broadened lasing material or an inhomogeneously broadened lasing material. The lasing material may include Erbium.

The cavity is preferably formed by an optical fiber having an input and an output ends and having at least a first reflector positioned proximate to the input end of the optical fiber. The first reflector may be substantially reflective to the emitted output radiation and substantially transmissive to the pump light. Alternatively, the first reflector may be substantially transmissive to the emitted output radiation and substantially reflective to the pump light.

The frequency modulator advantageously comprises an acousto-optic modulator producing an acoustic signal at a predetermined acoustic frequency, the acousto-optic modulator being further connected to a signal source for modulating the acoustic signal. The signal source may produce a sinusoidal sweep waveform, a triangular sweep waveform or a sawtooth sweep waveform. The rate of the sweep waveform is preferably between 100 Hz and 10 KHz.

The frequency modulator may also comprise a second reflector for substantially reflecting the output radiation emitted by the lasing medium and feeding back the reflected radiation via the acousto-optic modulator into the lasing medium. In such an embodiment, a portion of the output radiation emitted by the lasing medium is unaffected by the frequency modulator and another portion of the output radiation is deflected by the frequency modulator so that the other portion is sent back to the lasing medium for further amplification in the lasing medium. The acoustic frequency of the acoustic signal is preferably approximately 80 MHz.

Advantageously, the acousto-optic modulator is a Bragg cell deflector, the first reflector is a dichroic mirror and the second reflector is a flat or a curved feedback mirror. The laser source of the present invention may also comprise an objective for focusing the output radiation emitted by the lasing medium. In the case of an Erbium-doped fiber laser, the emission spectrum comprises at least two consecutive lines of emission, whereas the optical bandwidth of the frequency shifter is greater than the distance between the two consecutive lines of the emission spectrum of the lasing medium. Typically, the optical bandwidth of the acousto-optic modulator is approximately 10.8 nm. The sweep rate is advantageously approximately 1 KHz.

According to a second aspect of the present invention, there is disclosed an optical sensor for sensing an ambient effect, the optical sensor having an integration time, comprising a loop comprising an optical fiber having two polarization modes, each of the polarization modes propagating light at a different velocity, thereby providing an effective optical path length difference for the two modes for light traversing the loop; and a broadband laser source having a cavity for introducing radiation into the loop, the cavity having a lasing medium which emits output radiation in an emission spectrum in response to application of pump energy to the lasing medium, the laser source further comprising a frequency modulator for shifting the frequency of the output radiation by a predetermined frequency and for modulating the output radiation shifted by the predetermined frequency, the frequency modulator sweeping across a substantial portion of the emission spectrum in a period shorter than the integration time of the sensor. The ambient effect may be rotation. The radiation emitted by the laser preferably has a coherence length which is less than the optical path length difference.

According to a third aspect of the present invention, there is disclosed an apparatus, comprising an interferometer; and a broadband light source, comprising a cavity having a lasing medium which emits output radiation in an emission spectrum in response to application of pump light to the lasing medium; a frequency modulator in the cavity, the frequency modulator further comprising a frequency shifter for shifting the frequency of the output radiation by a predetermined frequency and a frequency sweeper for modulating the frequency shifter; and a pump light source that emits the pump light. The interferometer may comprise a Sagnac interferometer. The lasing medium may comprise an Erbium-doped single mode optical fiber. The frequency modulator is preferably a Bragg cell deflector.

According to a fourth aspect of the present invention, there is disclosed an apparatus, comprising a light source which, at a predetermined instant in time, emits radiation having a frequency spectrum, the light source including a medium which emits radiation in response to a pump signal, the frequency spectrum being defined by emission characteristics of the medium; a frequency shifter which frequency shifts the radiation through a range of optical frequencies over a predetermined period of time beginning at the predetermined instant in time to produce optical frequencies outside the spectrum; a detector which detects the radiation and integrates the radiation over a time at least as great as the predetermined period of time to generate a signal having a bandwidth greater than the frequency spectrum. The light source preferably comprises a laser having a cavity, the frequency shifter being disposed to frequency shift radiation inside the cavity. The apparatus of the present invention preferably comprises an interferometer loop connected to receive radiation from the light source and to output the radiation to the detector. The light source may comprise an optical fiber which emits radiation in response to optical pumping. The frequency shifting is preferably periodic, the predetermined period of time being equal to one half of the period of the frequency shifting.

According to another aspect of the present invention, there is disclosed an apparatus for tuning a homogeneously broadened emitting lasing medium, the lasing medium having an emission spectrum, the apparatus comprising a lasing medium, the lasing medium being pumped at a first wavelength to cause the lasing medium to emit radiation at a second wavelength of the emission spectrum; a frequency shifter for shifting the frequency of at least a portion of the radiation at the second wavelength and for feeding back the frequency shifted portion of the radiation into the lasing medium. The frequency shifter advantageously comprises a Bragg cell deflector.

According to another aspect of the present invention, there is disclosed an apparatus for electronically tuning a laser fiber doped with lasing medium, the lasing medium having an emission spectrum, the apparatus comprising a pump source for pumping the laser fiber at a first wavelength to cause the lasing medium to emit radiation at a second wavelength of the emission spectrum; a frequency shifter for shifting the frequency of at least a portion of the radiation at the second wavelength and for feeding back the frequency shifted portion of the radiation into the lasing medium. The frequency shifter preferably comprises a Bragg cell deflector.

According to another aspect of the present invention, there is disclosed a method of broadening a narrow-lined laser source having an emission spectrum, comprising the steps of pumping a lasing medium at a first wavelength to cause the lasing medium to emit radiation at a second wavelength of the emission spectrum; and modulating the frequency of at least a portion of the radiation at the second wavelength, the modulating step comprising the step of shifting the frequency of the radiation by a predetermined frequency and the step of sweeping the frequency at a predetermined rate. Preferably, the modulating step comprises the step of passing the radiation through a Bragg cell deflector driven by a frequency modulation source.

According to another aspect of the present invention, there is disclosed a method of tuning a homogeneously broadened emitting lasing medium having an emission spectrum, comprising the steps of pumping a lasing medium at a first wavelength to cause the lasing medium to emit radiation at a second wavelength of the emission spectrum; shifting the frequency of at least a portion of the radiation at the second wavelength; and feeding back the frequency shifted portion of the radiation into the lasing medium. Preferably, the shifting step comprises the step of passing radiation through a Bragg cell deflector.

According to another aspect of the present invention, there is disclosed a method for electronically tuning a laser fiber doped with lasing medium, the lasing medium having an emission spectrum, the method comprising the steps of pumping the laser fiber at a first wavelength to cause the lasing medium to emit radiation at a second wavelength of the emission spectrum; shifting the frequency of at least a portion of the radiation at the second wavelength and for feeding back the frequency shifted portion of the radiation into the lasing medium. Preferably, the shifting step comprises the step of passing radiation through a Bragg cell deflector.

According to another aspect of the present invention, there is disclosed a method of supplying broadband radiation to an interferometer, comprising the steps of pumping a lasing medium at a pump wavelength to cause the lasing medium to emit radiation at an emission wavelength; modulating the frequency of a portion at least of the radiation at the emission wavelength, the modulating step comprising the step of shifting the frequency of the radiation by a predetermined frequency and the step of sweeping the frequency at a predetermined rate; and coupling the emission to the interferometer. Preferably, the modulating step comprises the step of passing radiation through a Bragg cell deflector.

According to another aspect of the present invention, there is disclosed a method of broadening a narrow-lined laser source having an emission spectrum, comprising the steps of pumping a lasing medium at a first wavelength to cause the lasing medium to emit radiation at a second wavelength of the emission spectrum; and repetitively changing the frequency of a portion at least of the radiation at the second wavelength within a predetermined wavelength range.

According to another aspect of the present invention, there is disclosed a method of generating a broadband signal, comprising the steps of detecting radiation from a light source which, at a predetermined instant in time, emits radiation having a frequency spectrum; frequency shifting the radiation through a range of optical frequencies over a predetermined period of time beginning at the predetermined instant in time to produce frequencies outside the spectrum; integrating the detected radiation over a time which is greater than the period of time to generate a signal having a bandwidth greater than the frequency spectrum.

BRIEF DESCRIPTION OF THE DRAWINGS

FIG. 6 shows the gain narrowing exhibited by the spectra of FIG. 3a;

FIGS. 11a-11c show graphs of the spectrum of the output power for various values of the acoustic frequency of the Bragg cell without sweep;

DETAILED DESCRIPTION OF THE PREFERRED EMBODIMENT

Figure 1:
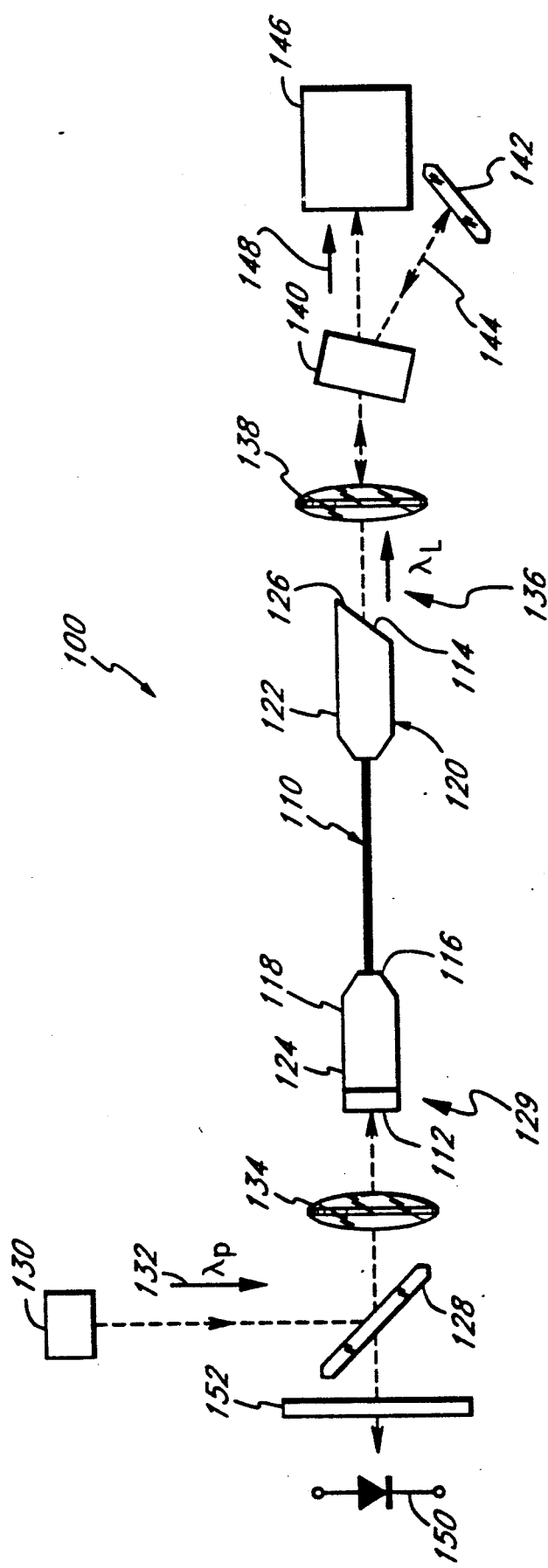
FIG. 1 illustrates an exemplary embodiment of the present invention which can be advantageously used as a light source for a gyroscope.

FIG. 1 illustrates an exemplary embodiment of the present invention which can be advantageously used as a light source for a gyroscope as described in more detail hereinbelow. As illustrated, the laser 100 comprises an optical fiber laser 110 that is preferably a single-mode optical fiber. In the embodiment shown in FIG. 1, the fiber laser 110 is formed of a silica glass that is doped with Erbium (Er) that lases to produce output light at one or several emission wavelengths in response to a pump optical signal at a pump wavelength. For example, the optical fiber 110 may be doped with a concentration of Erbium in the range of 50 to 500 ppm. In the embodiment shown in FIG. 1, the optical fiber is doped with a concentration of Erbium of a few hundreds ppm, e.g. 250 ppm. In the embodiments described herein, the preferred optical fiber 110 comprises a conventional telecommunications type of optical fiber of $SiO_2$, doped with approximately 250 ppm of Erbium. The exemplary optical fiber 110 has a core radius of approximately 3.41 microns and a cladding diameter of approximately 80 microns. The aperture number NA of the fiber shown in FIG. 1 is 0.129. The Erbium-doped optical fiber of FIG. 1 is preferably co-doped with Aluminum and Phosphorus. Although an Erbium-doped optical fiber is preferable in the present invention, the optical fiber 110 can be doped with another suitable lasing material.

The optical fiber 110 can absorb light at a multiplicity of absorption wavelengths. At the absorption wavelength of 650 nm ($Ar^+$ pump DCM dye laser), the rate of absorption is 5 dB/m for an Erbium-doped fiber having a concentration of 300 ppm of Erbium (see Mears article, "High-gain rare earth doped fiber amplifier at 1.54 nm"). Such an optical fiber 110 is manufactured by GTE Inc. and ATT Bell Lab, N.J.

When pumped with an optical signal at a pump wavelength in the absorption range of Erbium which is in the range of 500 nm to 1500 nm, at a sufficient intensity of the pump radiation, the Erbium doping emits light in an emission range of approximately 1528 nm to approximately 1580 nm, depending upon the pump wavelength and the pump intensity, as will be discussed more fully below. More specifically, the absorption peaks of Erbium are at 528 nm, 650 nm, 800 nm, 980 nm and 1490 nm. There are two peaks of emission at 1533 nm and 1559 nm. There is an additional emission of light at 580 nm but such emission has a substantially lower intensity.

The laser optical fiber 110 at the concentration mentioned above has a length that is preferably greater than 1 meter and which may be as great as 6 meters. The length of the fiber can be varied in accordance with the concentration of dopant. In the embodiment shown in FIG. 1, the length of the optical fiber is approximately 5 meters. It has been found that the spectral properties of the output power are substantially better for that length. When the optical fiber 110 has a shorter length, e.g., 2.8 meters, the spectral properties of the output power are not as good. However, at such a shorter length, the output power is greater than for longer lengths of the optical fiber 110. The optical fiber 110 has a first end 112 and a second end 114. A first end portion 116 of the optical fiber 110 proximate to the first end 112 is preferably enclosed within a first capillary tube 118 to provide support for the first end portion 116 and to provide a means for accurate alignment of the first end portion 116. Similarly, a second end portion 120 of the optical fiber 110 proximate to the second end 114 is preferably enclosed within a second capillary tube 122. The first end 112 is precisely ground and polished so that it defines a flat planar surface 124 substantially perpendicular to the longitudinal axis of the first end portion 116. In the preferred embodiment of the present invention, the proximal end of the first capillary tube 118 is ground and polished at the same time as the first end 112 of the optical fiber 110 so that the proximal end of the first capillary tube 118 is coplanar with the flat surface 124 of the first end portion 116. The second end 114 is ground and polished so as to define a planar surface 126 inclined at an angle greater than 10°, e.g., in the embodiment of FIG. 1, at approximately 15° with respect to the transversal axis of the second end portion 120. The planar surface 126 guarantees no reflection and hence no resonant structure. The distal end of the second capillary tube 122 is ground and polished at the same time as the second end 114 of the optical fiber 110 so that the distal end of the second capillary tube 122 is coplanar with the planar surface 126.

The laser 100 preferably includes a first mirror 128 that is mounted proximate to the first end 112 of the optical fiber 110. In the embodiment shown in FIG. 1, the mirror 128 is inclined at an angle of 45° with respect to the horizontal. The mirror 128 is advantageously a dichroic mirror having substantially 100% reflectivity at a first range of optical wavelengths, corresponding to the wavelengths of a pump signal, and having substantially no reflectivity at a second range of wavelengths, corresponding to the wavelengths of an emitted signal. The dichroic mirror 128 filters out the pump light from the output light to be detected. The structure of such a dichroic mirror is well known in the art.

The laser of the present invention further preferably comprises a second dichroic mirror 129, mounted on the first end 112 of the optical fiber 110. The mirror 129 preferably has a flat reflective surface and is mounted with respect to the first end 112 so that the flat reflective surface of the mirror 129 is parallel with the surface 124 of the first end 112. Thus, a line normal to the flat reflective surface of the mirror 129 is aligned with the longitudinal axis of the first end portion 116 of the optical fiber 110. In such an embodiment of the invention, the first capillary tube 118 is advantageously used as a mounting surface for the mirror 129 to provide the above-described alignment. The mirror 129 may be attached to the first capillary tube 118 with a suitable adhesive. In another embodiment of the invention, the mirror 129 is fabricated by depositing reflective coatings on the first end 112 of the optical fiber 110. In the embodiment of FIG. 1, the output light wavelength is approximately an integer multiple of the input wavelength (approximately three times the input wavelength). A dichroic mirror cannot easily discriminate between such wavelengths. Thus, if the mirror transmits substantially most of the pump light, i.e., it reflects substantially no pump light, it may also reflect a small portion of the output light. The design of a good dichroic mirror discriminating between wavelengths multiple of one another is deemed to be difficult and expensive. In the preferred embodiment of the present invention, the pump wavelength is not an integer fraction of the output wavelength so that readily available dichroic mirrors can be used.

In another embodiment of the present invention, there is no mirror mounted on the first end 112 of the optical fiber 110 but the planar surface 124 is polished flat so that it provides a 4% reflective surface. Thus, in such a configuration, if the pump light wavelength is an integer fraction of the output light wavelength, the planar surface 124 provides a 4% reflective surface for both the wavelengths of the pump light and the output light. The planar surface thus transmits 96% of the pump optical signal and substantially reflects 4% of the laser light emitted by the fiber laser. Although the reflectivity of the planar surface is low for the output light (4%), it is sufficient to produce laser emission in the cavity of the laser of the present invention. In the aforementioned embodiments wherein the mirror is positioned such that a line normal to the flat reflective surface of the mirror 129 is aligned with the longitudinal axis of the first end portion 116 of the optical fiber 110, the characteristics of the dichroic mirror 129 must be such that the mirror is essentially transmissive at the pump wavelength and essentially reflective at the output light wavelength. In the embodiment shown in FIG. 1, the characteristics of the mirror 128 are inverse due to the different positioning of the pump source and the detector and the angular inclination of the mirror 128.

The laser 100 of the present invention further includes an optical pump source 130 that is preferably a laser diode at 1490 nm. A laser diode emitting at such a wavelength is preferable as the pump light wavelength is close to the output light wavelength. At this wavelength, there is no excited state absorption which increases the efficiency of conversion. The next best wavelength of pumping light is 980 nm. In the embodiment shown in FIG. 1, the pump source is an Argon-ion laser, readily available for experimental purposes. The optical pump source 130 generates a pump optical signal represented by an arrow 132 at a wavelength $\lambda_P$, which corresponds to a selected one of the absorption wavelengths of the Erbium doping of the optical fiber 110. In the embodiment shown in FIG. 1, the pump source emits radiation at a wavelength of 514.5 nm with about 1 W maximum power output. It should however be noted that this wavelength suffers from excited state absorption which reduces the efficiency of conversion. In the embodiment shown in FIG. 1, the pump source has a launched power output of approximately 830 mW. The person skilled in the art will recognize that other pump sources can be selected that emit radiation at other wavelengths. For example, a steryl-13 dye laser can be used. This pump source emits radiation at a wavelength of 980 nm.

The optical pump source 130 is aligned with respect to the dichroic mirror 128 and the longitudinal axis of the first end portion 116 of the optical fiber 110 so that the pump optical signal 132 is reflected on the first dichroic mirror 128 and is introduced into the first end portion 116 of the optical fiber 110 via the first end 112. In the alternative embodiment without dichroic mirror, the pump optical signal passes through the planar surface 124 of the first end 112.

The pump optical signal 132 may be focused on the longitudinal axis of the first end portion 116 of the optical fiber 110 by a first lens 134, as illustrated in FIG. 1. In the embodiment shown in FIG. 1, the lens is a 18x objective. Alternatively, in the preferred embodiment having the second dichroic mirror 129 directly deposited on the first end 112, the first end 112 can be positioned proximate to the output of the pump source 130 (e.g., by butt-coupling the pump source output to the first end 112 with a small space in between to avoid scratching the reflective coating).

The pump optical signal 132 introduced into the first end portion 116 propagates in the optical fiber 110 towards the second end 114. As the pump optical signal 132 propagates towards the second end 114, the optical energy of the pump optical signal 132 is absorbed by the Erbium doping ions of the optical fiber 110, causing the ions to change state. When the ions relax (i.e., return to their original stable state), photons are emitted at an emission wavelength that is longer than the pump wavelength. This emission effect is known to the art and has been used advantageously to produce superfluorescent broadband sources by pumping an Erbium-doped fiber with a pump optical signal of sufficient intensity to cause spontaneous emission in a random manner so as to provide an output signal having a low temporal coherence. See, for example, U.S. Pat. No. 4,637,025. This patent is hereby incorporated by reference herein. Such superfluorescent broadband sources are specifically constructed so that the emitted light passes directly out of the second end of the optical fiber. Thus, such superfluorescent broadband sources do not operate in the same manner as resonant cavity lasers.

In the present invention, some of the spontaneously emitted light is initially directed toward the first end 112 of the optical fiber 110, reflected on the dichroic mirror 129 or alternatively on the first end 122 and then redirected toward the second end 114.

The light transmitted through the angled end 114 is emitted from the doped fiber at a wavelength $\lambda_L$, represented by an arrow 136. In one embodiment, the laser output signal is focused by a second lens 138 which is aligned with the longitudinal axis of the second end portion 120 of the optical fiber 110. In the embodiment of FIG. 1, the lens 138 is a 10x objective. After the output light 136 has been recollimated by the lens 138, it passes through an acousto-optic modulator 140. The acousto-optic modulator 140, also referred to as a Bragg cell, utilizes a collinear interaction between an ordinary optical wave, an extraordinary optical wave, and a travelling acoustic wave in a birefringent crystal. On a microscopic basis, the acoustic wave couples light of one polarization into the orthogonal polarization. In the embodiment shown in FIG. 1, the Bragg cell 140 is an AOM-80F manufactured by Interaction Corporation.

Thus, a portion of the output light 136 is deflected in the Bragg cell 140 and is directed toward a mirror 142. The direction of the deflected radiation is indicated by the arrow 144. The remaining portion of the output light 126 is collected by a spectrum analyzer 146 and is indicated by the arrow 148. The spectrum analyzer provides a spectral analysis of the output beam 148. The spectral analyzer can be an Ando swept grating spectrum analyzer with 0.1 nm resolution.

The portion of the output light that is deflected by the Bragg cell 140 and reflected by the mirror 142 is redirected toward the optical fiber 110. A substantial portion of that light exits the first end 112 of the optical fiber 110, passes through the dichroic mirror 128 and is collected by a detector 149. In order to filter out any pump light that may be present in the output beam, the detector 150 may also comprise an optical filter 152 such as a gallium arsenide wafer. The undeflected light beam 148 is referred to as the zeroth order beam whereas the deflected light beam 144 is referred to as the first order beam. In the embodiment shown in FIG. 1, the acoustooptic modulator is an 80 MHz acousto-optic modulator. The portion of output light deflected by the Bragg cell 140 is parametrically downshifted or upshifted by the acoustic frequency $\omega_a$, depending on the relative Bragg angle of the optical wave and the acoustic wave. In the preferred embodiment of the present invention, the Bragg cell is selected and positioned such that the portion of output light deflected by the Bragg cell 140 is downshifted by the acoustic frequency $\omega_a$. This deflected beam is thus frequency-shifted by an amount in frequency corresponding to the value of the acoustic frequency. In the embodiment shown in FIG. 1, a maximum of 60% of the output beam 136 is deflected in the Bragg cell 140. The deflected beam 144 is then reflected by the mirror 142. In the embodiment shown in FIG. 1, the power reflection coefficient of the mirror 142 is 99%. The mirror 142 shown in FIG. 1 is preferably a flat mirror. In an alternative embodiment, the mirror 142 is a curved feedback mirror. The deflected beam 144, upon reflection from the mirror 142 is redirected toward the Bragg cell 140 and shifted again in the same direction as the original deflected beam 144. For example, if the Bragg cell 140 upshifts the optical signals by an amount equal to $\omega_a$, an optical wave at the frequency $\lambda_L$ is shifted to the value $\lambda_L + 2\omega_a$ after a round trip through the Bragg cell 140. The optical wave upshifted or downshifted twice is then reintroduced into the optical fiber 110. The change in frequency disturbs the feedback condition as normally conceived. The repeated downshifting (respectively upshifting) may yield a chirping cavity mode.

Because the mirror 142 is flat, it defines a beam waist location and the subsequent angular divergence in the Bragg cell 140 about 15 cm away. In the embodiment shown in FIG. 1, a spot radius of 1 mm at the mirror 142 and an acoustic transducer size of 6 nm produce a broad optical bandwidth of approximately 100 nm in the Bragg cell 140. The limiting width of the tuning system comprising the lens 138, the acousto-optic modulator 140 and the flat feedback mirror 142 is due to angular wavelength discrimination produced by the use of the flat feedback mirror and the aperturing effect of the fiber core of the optical fiber 110. In the embodiment of FIG. 1, the calculated tuning system passband is 10.8 nm. This broad filter in combination with the gain spectrum of Erbium defines the passband of the system at any chosen acoustic frequency. In the embodiment shown in FIG. 1, the Bragg cell is inside the laser cavity. Additionally, the combination of the input end 112 of the optical fiber 110 and the objective lens 134 in the embodiment of FIG. 1 act as a secondary cavity within the main cavity and give rise to some mode selection (referred to as étalon mode selection). The usual étalon mode selection and the subsequent coherence effects would not be expected however with a Bragg cell inside the secondary cavity, i.e., between the first end 112 of the optical fiber and the lens 134. This is not possible in the embodiment shown in FIG. 1 as the distance between the first end 112 and the lens 134 is on the order of a few mm which does not allow the positioning of a Bragg cell.

In the embodiment shown in FIG. 1, the acousto-optic modulator 140 is adjusted to create a maximum power of 13.5 mW at an acoustic frequency of 80 MHz. A change in the acoustic frequency causes a change in the wavelength of the output laser light. More specifically, an increase in modulator frequency produces a decrease in the wavelength of light deflected most efficiently to the first order beam. In addition to the electron tuning of the wavelength of the output light, a sinusoidal sweep waveform is also used to frequency modulate the carrier signal driving the acousto-optic modulator 140. In one embodiment of the present invention, the sinusoidal waveform is at a frequency of 1 KHz and is voltage adjusted to produce a maximum frequency deviation of 0.55 MHz from the center frequency. This center frequency is preferably varied from 78.7 MHz to 80.9 MHz to change the region of sweep. Other sweep waveforms can be used such as a triangular sweep waveform or a sawtooth waveform.

Mode of Operation without the Bragg Cell

Figure 2:
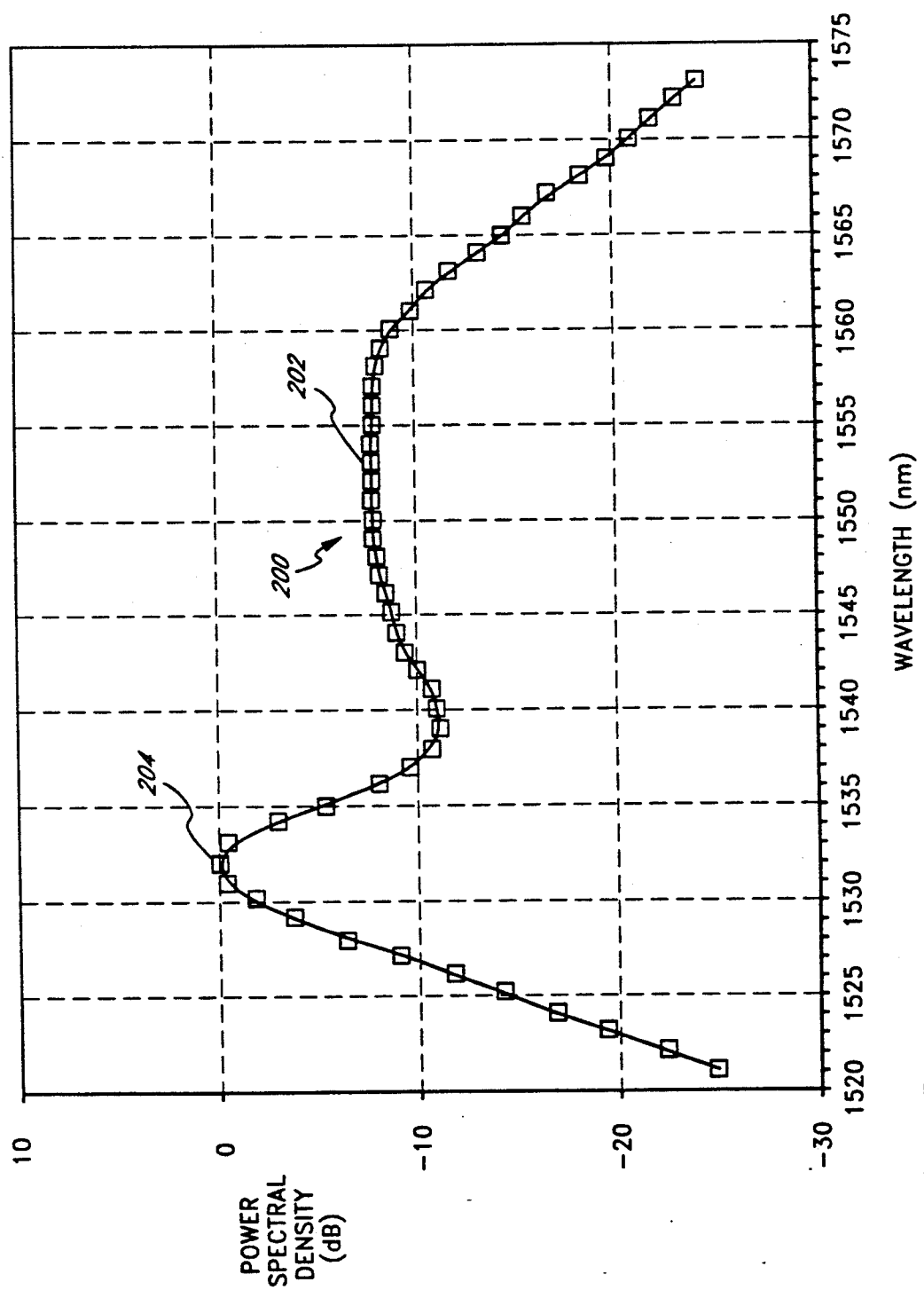
FIG. 2 illustrates the output fluorescence spectrum of the fiber laser of FIG. 1 when the Bragg cell is turned off for a fiber length of 5 meters.

In order to better understand the operation of the laser of the present invention, reference is now made to FIG. 2 which illustrates the output spectrum of the laser 100 of FIG. 1 when the Bragg cell 140 is turned off. The graph of FIG. 2 depicts the measured power spectral density of the laser output signal 148 versus the wavelength $\lambda_L$ of the laser output signal 148 for a given wavelength $\lambda_P$ of the optical pump signal 132 (in the embodiment shown in FIG. 1, the value of $\lambda_P$ is 514.5 nm) and for a certain output power (e.g., 2.75 mW for the spectrum of FIG. 2). The horizontal scale in the graph of FIG. 2 is the output wavelength $\lambda_L$ in nanometers and the vertical scale is the output power. The units of the vertical scale are arbitrarily shifted dB scales and permit the visualization of the general shape of the spectrum of the ASE ("Amplified Spontaneous Emission") output. As mentioned above, the graph depicts the power density of the laser output 148 when the Bragg cell 140 is turned off. Thus, all the light exiting the second end 114 of the optical fiber 110 traverses the Bragg cell 140 undeflected and unshifted in frequency.

The spectrum 200 shown in FIG. 2 demonstrates a double peaked line. The leftmost peak 204 is centered around the value 1,532 nm. The rightmost peak, indicated by the numeral 202, is centered around 1,557 nm, with a flat region extending from 1545 nm to 1560 nm. The optical bandwidth of the spectrum is determined by the leftmost peak at 1,532 nm and is relatively narrow over this peak (approximately 5.5 nm). The fact that this linewidth becomes narrower with increasing input power indicates a mostly homogeneously broadened transition. Superfluorescence, also referred to as Amplified Spontaneous Emission (ASE) is generally an undesirable noise component to be reduced as much as possible. However, in some specialized applications such as fiber optic gyroscopes, it is desirable to generate high power sources with short coherence lengths and no longitudinal mode structure at longer wavelengths. The Erbium fluorescence line seems useful for this purpose.

Figure 3B:
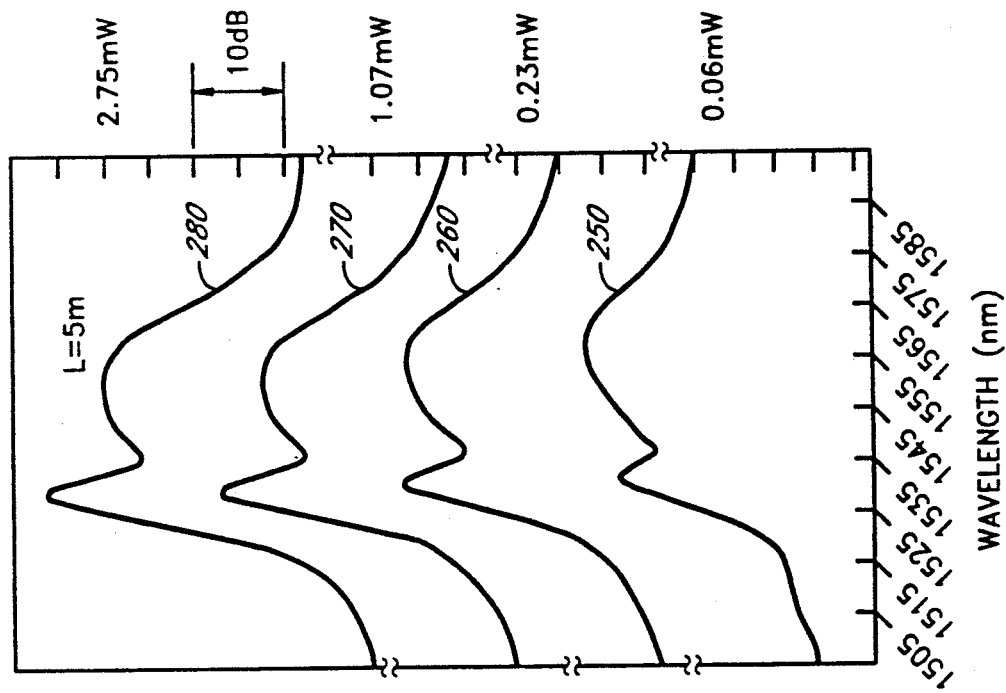
FIGS. 3a and 3b show the measured power spectral densities of the laser output signal in the fiber laser of FIG. 1 when the Bragg cell is turned off versus the wavelength $\lambda_L$ of the laser output signal for a given wavelength λp of the optical pump signal, for various lengths of the fiber and for various values of the output power levels.
Figure 3A:
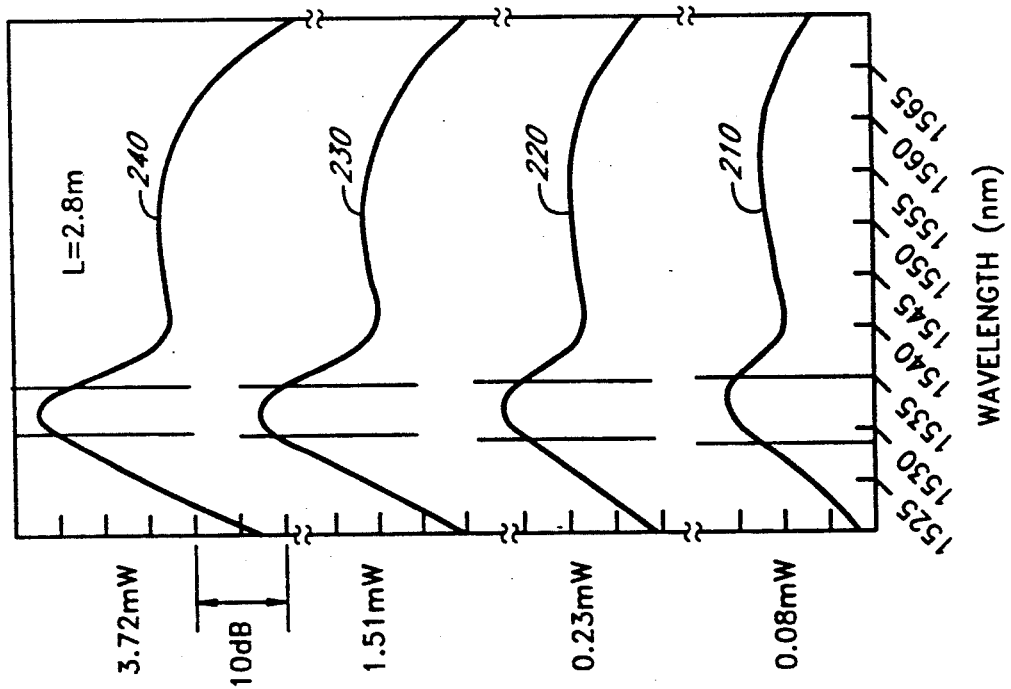

Reference is now made to FIGS. 3a and 3b, which show the measured output power spectral densities of the laser output signal 148 versus the wavelength $\lambda_L$ of the laser output signal 148 for a given wavelength $\lambda_P$ of the optical pump signal 132 (in the embodiment shown in FIG. 1, the value of $\lambda_P$ is 514.5 nm) and for two lengths of the optical fiber 110 (2.8 meters for FIG. 3a and 5 meters for FIG. 3b). Similarly to FIG. 2, the horizontal scale represents the wavelength of the output beam in nanometers and the vertical scale represents the power spectral density in arbitrarily shifted dB scales.

The optical fiber 110 used in the embodiment shown in FIG. 1 is therefore cut and polished at two different lengths, 2.8 m and 5 m. The spectra at 2.8 meters of fiber length are respectively represented by the numerals 210, 220, 230 and 240 for the output power levels of 0.08 mW, 0.23 mW, 1.51 mW and 3.72 mW respectively. The output power level spectra are labelled with 3 dB widths. In other words, the width of these spectra is selected such that the difference between the maximum power and the lower power selected within the desired width is 3 dB. These widths are indicated by vertical lines around the 1530 nm peak in FIG. 3a for the 2.8 m spectra. The spectra at 5 meters of fiber length are respectively represented by the numerals 250, 260, 270 and 280 for the output power levels of 0.06 mW, 0.23 mW, 1.07 mW and 2.75 mW respectively. Other lengths can be considered in the range from 1 m to 6 m. Lengths of 1 m and 6 m, however, show markedly reduced power outputs. At 1 m, pump absorption is low, while at 6 m, fiber losses increase dramatically in the forward direction. The spectra for the length of 1 and 6 meters are not represented in FIGS. 3a and 3b. Most of the spectra shown in FIGS. 3a and 3b demonstrate a twin-peaked fluorescence spectrum around 1.53 nm and 1.56 nm. It is also noteworthy that, as the fiber length increases, absorption increases more rapidly at the left peak than at the right peak, which leads to an increasing dominance of the peak at 1.56 µm and a shift in mean wavelengths to higher values. The right peak appears broader than the left peak, but it is only dominant at reduced power output levels and greater lengths of the optical fiber. As the output power level is increased, the peak at 1530 nm narrows considerably. This is consistent with the expected response of a mostly homogeneous line which sees preferential gain at the peak wavelength as the photons traverse the gain medium. The effect would not be expected in an inhomogeneous laser transition since atoms off-line center would not be coupled to those at the peak. Even when there is no mirror at the input end of the optical fiber 110 (FIG. 1), the 4% reflection at the first end 112 of the optical fiber 110 helps increase this effect by creating additional reflected power which travels through an increased length of gain medium. FIG. 3b also shows that for longer lengths of the optical fiber, the output light has better spectral properties (and thus better tuning possibilities) but reduced output power in comparison with the spectra produced for shorter lengths.

Figure 4A:
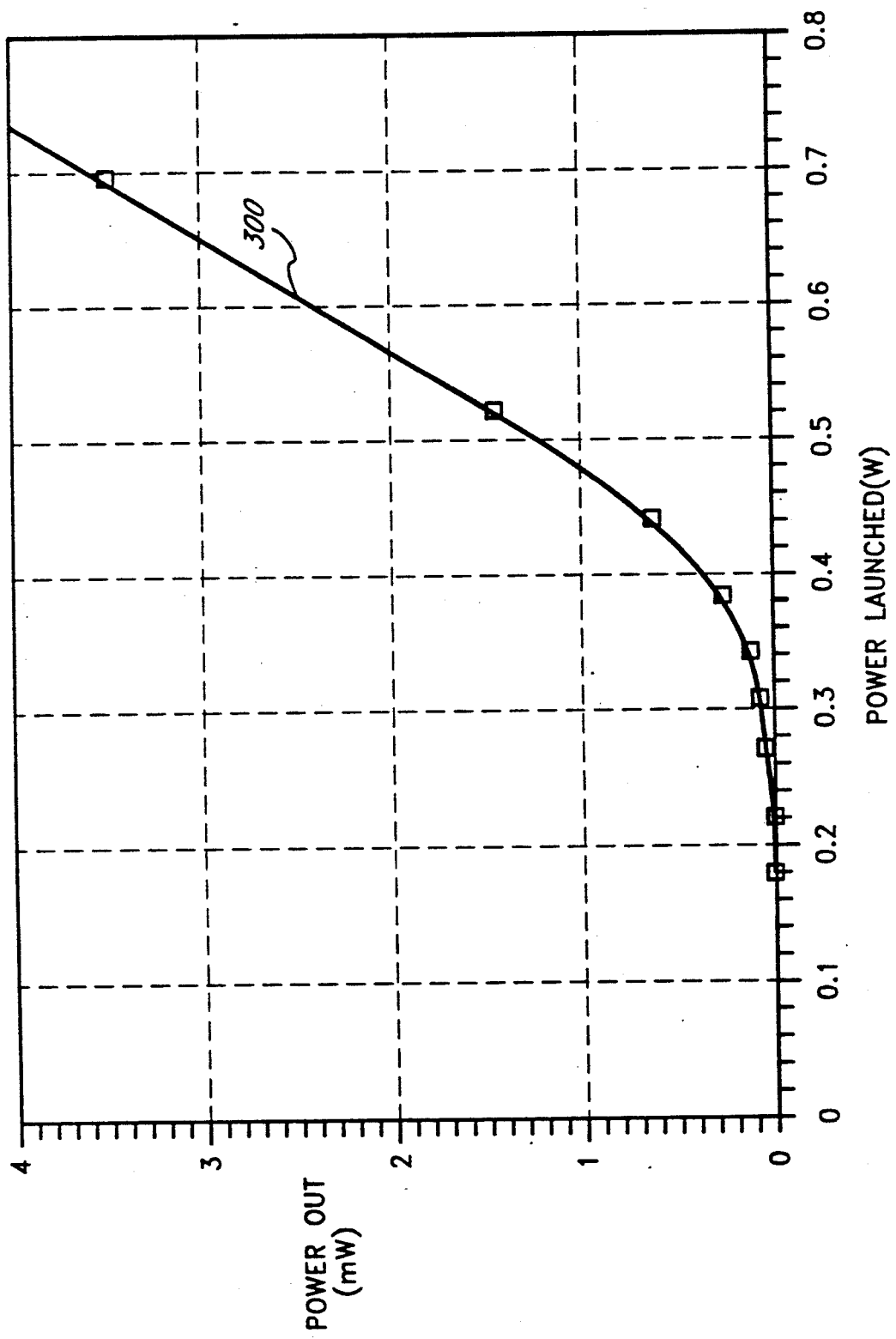
FIG. 4a shows the measured output fluorescence power of the fiber laser of FIG. 1 as a function of the pump power launched into the optical fiber when the Bragg cell is turned off.

Reference is now made to FIG. 4a which shows the measured output power of the laser of FIG. 1 as a function of the pump power launched into the optical fiber 110. The spectrum shown in FIG. 4a is characteristic of an ASE source. The horizontal scale represents the launched input power in W whereas the vertical scale represents the output power in mW. The length of the fiber selected for the plot of FIG. 4a is 5 meters. As mentioned above, a shorter optical fiber would produce slightly higher power levels. However, the spectral properties of spectra obtained with longer optical waves are substantially better and thus more desirable for tuning. The person skilled in the art will recognize that the curve of FIG. 4a is merely exemplary and illustrative of the ASE properties of the laser of the present invention used without a Bragg cell.

The curve 300 of FIG. 4a exhibits the gradual curved form near threshold that is typical of ASE sources, rather than the straight line relationship of a resonant laser structure. Relatively high launched power levels are required in order to produce substantial power output. At very high powers, the curve approaches a linear relationship as saturation effects become dominant.

Figure 4B:
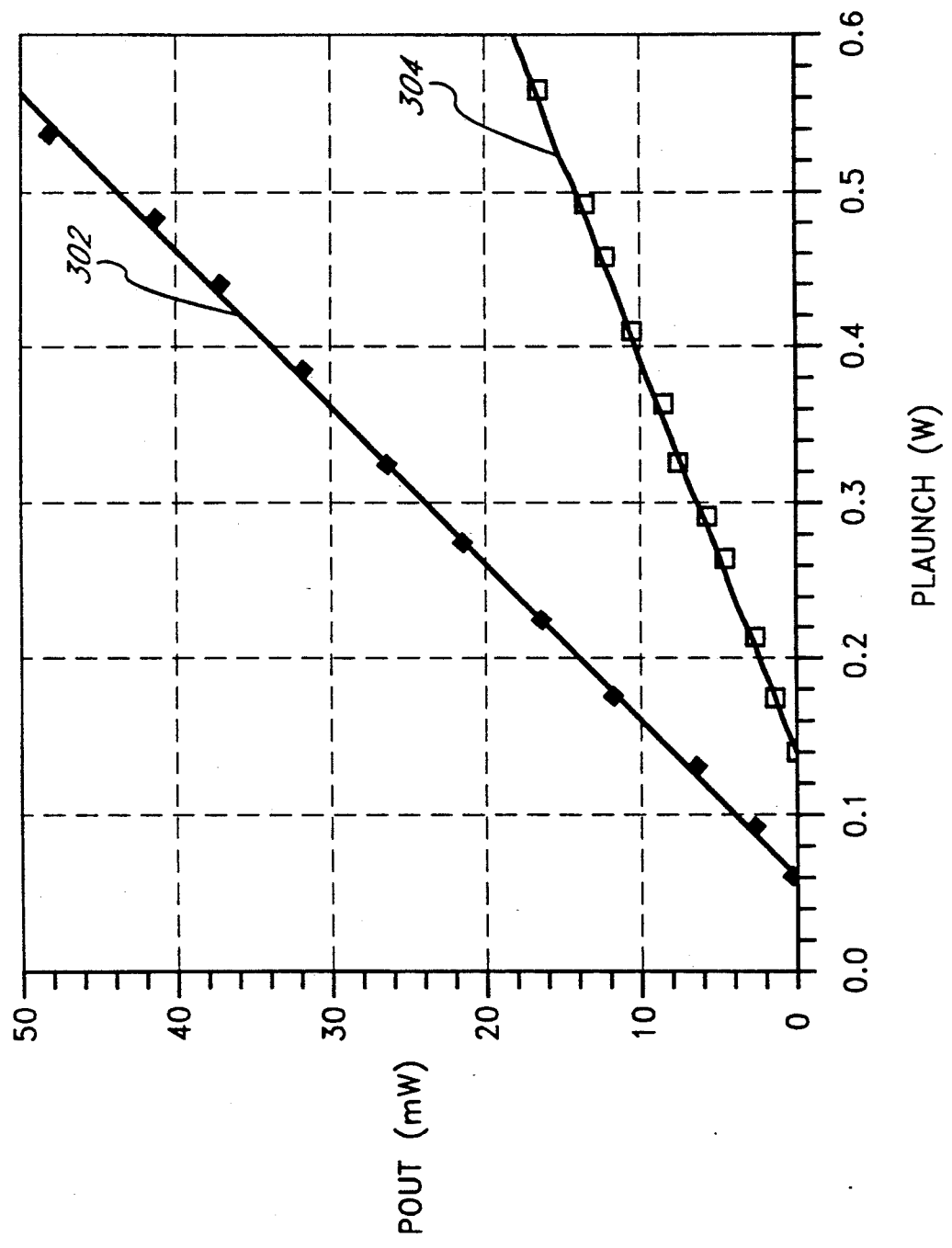
FIG. 4b shows the measured output power of the fiber laser of FIG. 1 as a function of the pump power launched into the optical fiber of FIG. 1 when the fiber laser operates as a resonant laser.

FIG. 4b shows the measured output power of the laser of FIG. 1 operating as a resonant laser (i.e., with a two-mirror cavity) as a function of the pump power launched into the optical fiber 110 for other characteristics of the fiber laser of FIG. 1. In particular, in FIG. 4b, the measured output power is plotted against the pump power launched into an Erbium-doped fiber having a length of 5 meters and a concentration of Erbium on the order of 50 ppm. Two curves are represented in FIG. 4b. Curve 302 corresponds to a configuration in which the reflectivity of the input end 112 of the optical fiber 110 used as a mirror of the embodiment of FIG. 1 is 4% for the pump signal wavelength and the output laser light. Furthermore in the configuration shown by curve 302, an output mirror is also mounted on the output end 114 of the fiber laser illustrated in FIG. 1. The reflectivity of the output mirror is selected to be 96%. For these mirror reflectivities, the output power measured varies linearly, with a threshold pump power of about 80 mW. For higher values of the pump power around 600 mW, the measured power is on the order of 50 mW.

Another curve 304 corresponds to another configuration of the embodiment of FIG. 1 in which the input end mirror 112 has a reflectivity of about 4% and the output end mirror has a reflectivity of about 4%. The output power measured varies linearly and reaches approximately 18 mW for maximum launched pump power. The threshold pump power is approximately 140 mW.

Figure 5A:
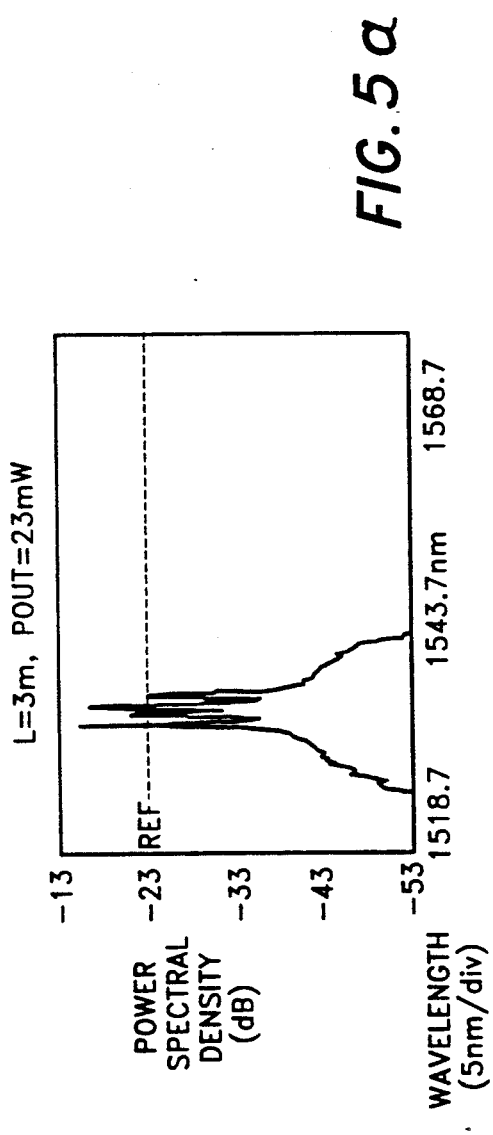
FIGS. 5a and 5b depict the resonant laser spectra of the fiber laser of FIG. 1 respectively having 3 and 5 meters of length and for 23 mW and 17.7 mW of measured output power when the fiber laser operates as a resonant laser.
Figure 5B:
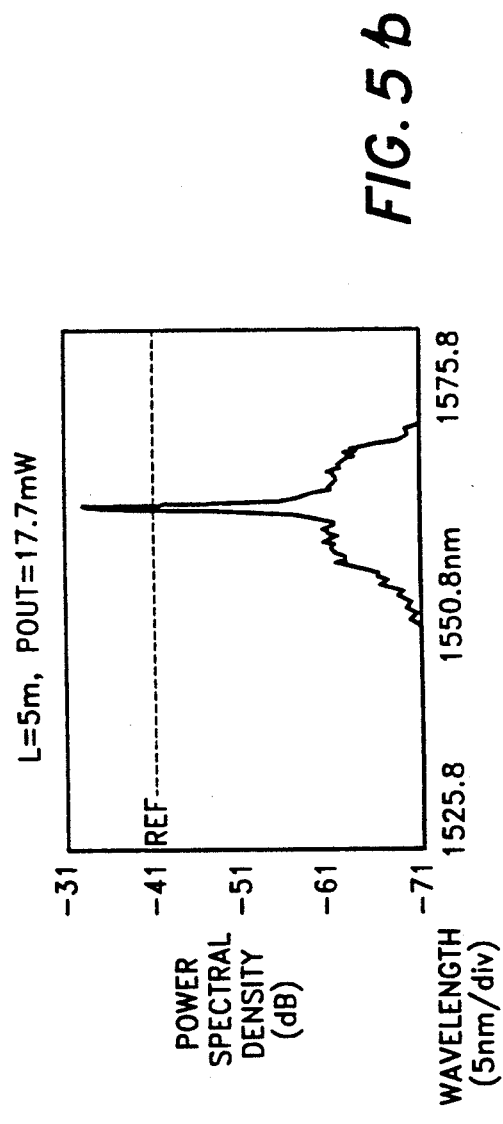

FIGS. 5a and 5b depict the resonant laser emission spectra of the fiber laser of FIG. 1 used as a resonant laser having 3 and 5 meters of length respectively and for 23 mW and 17.7 mW of measured output power. These spectra are merely illustrative of the resonant laser characteristics of Erbium-doped fiber lasers. FIGS. 5a and 5b show that as the output power increases, the optical bandwidth of the spectrum, as measured at half maximum (i.e., full width at half maximum, also referred to as "FWHM"), becomes very narrow. The fine structure observed in the spectra of FIGS. 5a and 5b is due to an accidental talon effect.

Figure 6:
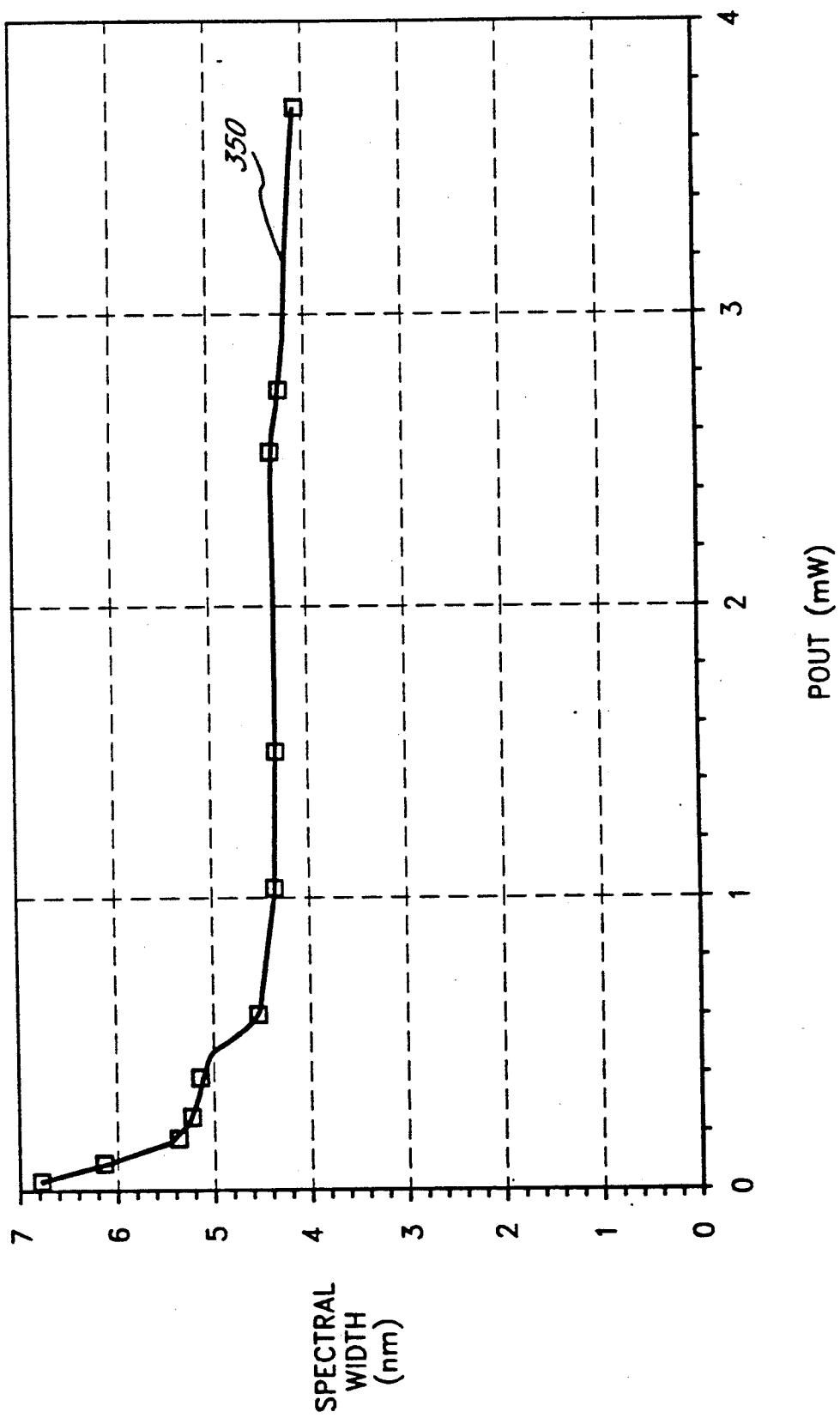

Reference is now made to FIG. 6 which shows the gain narrowing exhibited by the spectra of FIG. 3a. The gain narrowing is put in a more quantitative form in FIG. 6 where the 3 dB spectral width (vertical scale) is plotted as a function of the output power (horizontal scale). The spectral width is reduced from nearly 7 nm at lower powers to an apparently limiting width of about 4 nm at 4 mW. Most of this reduction occurs below 1 mW of output power which corresponds to the curved threshold region of the power curve in FIG. 4a for this particular length. The curve 350 of FIG. 6 plateaus at a value approximately of 4 nm or slightly more for values of the output power greater than 1 mW.

Erbium-doped fibers, when utilized as nonresonant ASE sources, can thus produce high power levels over fairly broad spectral linewidths. However, design of such a source requires careful consideration of the variation of the output spectrum as a function of fiber length and output power. The 1.56 μm peak becomes dominant over the 1.53 μm peak at longer lengths at the expense of reduced power output. The spectral narrowing at high power levels which is consistent with the model of a mostly homogeneous transition is also of significance for applications requiring broad spectra and high powers.

A more complete description of the laser characteristics of Erbium-doped fibers can be found in an article by M. S. O'Sullivan et al., "High-Power Narrow-Linewidth $Er^{3+}$-fiber laser," *Optics Letters*, 14, 9 (May 1989) and in the aforementioned article by C. A Millar et al, "Low Threshold CW Operation of an Erbium-Doped Fiber Laser Pumped at 807 nm Wavelength," *Electronics Letters*, 23, 6, (Jul. 30, 1987). A thorough description of the ASE characteristics of Erbium-doped fibers can be found in Emmanuel Desurvire and Jay R. Simpson, "Amplification of Spontaneous Emission in Erbium-Doped Single-Mode Fibers," *IEEE Journal of Lightwave Technology*, Volume 7, Number 5, May 1989. These articles are hereby incorporated by reference herein.

Thus, when the Bragg cell 140 is off, the fiber laser of FIG. 1 produces the high power (2.75 mW for a length of 5 meters) fluorescence spectrum shown in FIG. 2. This spectrum is altered when the Bragg cell 140 is turned on.

Mode of Operation With the Bragg Cell and Without Sweeping

Electronically tunable acousto-optic filters and modulators are well known in the art. See, e.g., S. E. Harris, et al., "Electronically Tunable Acousto-Optic Filter," *Applied Physics Letters*, Volume 15, Number 10, pp. 325–326, Nov. 15, 1969. An acoustooptically tuned semiconductor laser has also been described more recently in G. Coquin, et al., "Single and Multiple-Wavelength Operation of Acoustooptically Tuned Semiconductor Lasers at 1.3 microns," *IEEE Journal of Quantum Electronics*, Volume 25, Number 6, June 1989, pp. 1575-1579. These articles are hereby incorporated by reference herein.

As mentioned above in connection with the tunability of fiber lasers, acousto-optic filters have been used to electronically tune a laser. In F. V. Kowalski, et al., "Broadband Continuous-Wave Laser," *Optics Letters*, Volume 13, Number 8, pp 622-624, August 1988, a cw ring dye laser is described in which the light is shifted in frequency before being fed back into the gain medium. According to the Kowalski reference, there is no Fabry-Perot frequency discrimination in such a laser because the interference, from multiple reflections, is between waves of different frequencies. The broadband spectrum of the spontaneously emitted light is fed back into the gain medium with no frequency discrimination, apart from the dispersive effects of the acoustic grating. The dominant characteristic of such a laser is that the output power is distributed over a broad spectral region. The theoretical analysis developed in the Streifer reference for this source further suggests that the output of such a cavity should produce peak optical power at the edge of the optical passband towards which energy is swept by the modulator rather than at the line center. This article is hereby incorporated by reference herein.

In this mode of operation, the Bragg cell 140 acts as an acousto-optic modulator but the acoustic wave is not yet frequency modulated (also referred to as "sweeping").

When the Bragg cell 140 of FIG. 1 is on (feedback loop closed), the deflected beam 144 is reflected back into the optical fiber 110 using the reflector 142. Hence, all photons in the cavity are shifted by the acoustic frequency twice per round trip. With the Bragg cell 140 operating at 80 MHz the optical fiber 110 produces a typical straight line power curve with a threshold of 350 mW and a peak output of 13.5 mW at 830 mW launched power.

A variable frequency source (not shown), is used to drive the acousto-optic modulator 140. In the embodiment shown in FIG. 1, the variable frequency source is amplified to a maximum of 6 Watts in order to avoid degradation of the Bragg cell. In the preferred embodiment of the present invention, the system is adjusted to give a peak output power of 13.5 mW at an acoustic frequency of 80 MHz. As indicated previously, the spot size of the beam 144, measured at the flat feedback mirror 142 is approximately 1 mm which, in theory, produces a broad optical bandwidth of about 100 nm in the acousto-optic modulator 140 used in the embodiment of FIG. 1 (acoustic transducer size of 6 cm). This optical bandwidth is much broader than the tuning range observed in experimentation. In order to better understand the demonstrated tuning ranges, it is useful to define the tuning system as comprising the second end 114 of the optical fiber 110, the lens 138, the Bragg cell 140 and the mirror 142. For any given wavelength, a transmission coefficient can be defined as the fraction of power emitted from the fiber 110 that returns and is recoupled into the fiber 110 by the tuning system. The FWHM of a plot of this transmission coefficient is defined as the tuning system passband. One component of this passband is the single-pass optical bandwidth of the Bragg cell 140. However, as mentioned above, with an optimal beam size of about 1 mm radius and an acoustic transducer of 6 cm, the Bragg cell alone has a theoretical bandwidth in excess of 100 nm. The limiting width of the tuning system passband is due to angular wavelength discrimination produced by the use of the flat feedback mirror 142 and the aperturing effect of the fiber core of the optical fiber 110. For a given acoustic frequency, one wavelength component $\lambda_1$ of the beam is exactly centered at its Bragg angle $\theta_1$, deflects most ideally to the flat mirror 142, and couples back into the fiber 110. The wavelength $\lambda_1$ is the center of the tuning system passband. Some other wavelength $\lambda_2$ which is $\Delta\lambda = \lambda_2 - \lambda_1$ away from the line center is not at its Bragg angle but at an angle $\Delta\theta = \theta_1(\Delta\lambda/\lambda_1)$ (assuming small angles) away from its Bragg angle. This $\lambda_2$ component is in error by $2\Delta\theta$ with respect to the $\lambda_2$ path after its first pass through the Bragg cell 140 and $4\Delta\theta$ after the return pass. Incorporation of a curved feedback mirror would remove this angular selection and, to the detriment of the device of the present invention, eliminate any wavelength discrimination due to this effect. When passing through an objective lens of focal length f, such as the objective 138, an angular error of $4\Delta\theta$ introduces a translation of $4f\Delta\theta$ at the focal plane of the lens next to which the fiber 110 is mounted. A translation of $0.83 w_o$ where $w_o$ is the beam amplitude spot size, reduces the overlap integral to $\frac{1}{2}$. In the embodiment of FIG. 1, at a wavelength of 1,550 nm, the Bragg angle at an acoustic frequency of 80 MHz is 19.5 mrad, the spot size in the fiber 110 is about 4.9 μm, and the focal length of the lens 138 is 15 mm. Using these numbers, the calculated tuning system passband is 10.8 nm which is consistent with the experimental result that the two peaks of the fiber laser spectrum can oscillate 10 nm apart. Use of a longer focal length objective (lower power) would decrease the system passband and increase the tuning range into the 10 nm gap but such lenses have smaller numerical apertures than the fiber 110 used in the laser of FIG. 1.

The configuration illustrated in FIG. 1 produces, in the first-order beam, a downshift in frequency of 160 MHz or equivalently an upshift in wavelength of $1.25 \times 10^{-2}$ Angström for each round trip. An increase in the acoustic frequency of the acousto-optic modulator 140 produces a decrease in the wavelength of light deflected most efficiently to the first-order beam.

Figure 7:
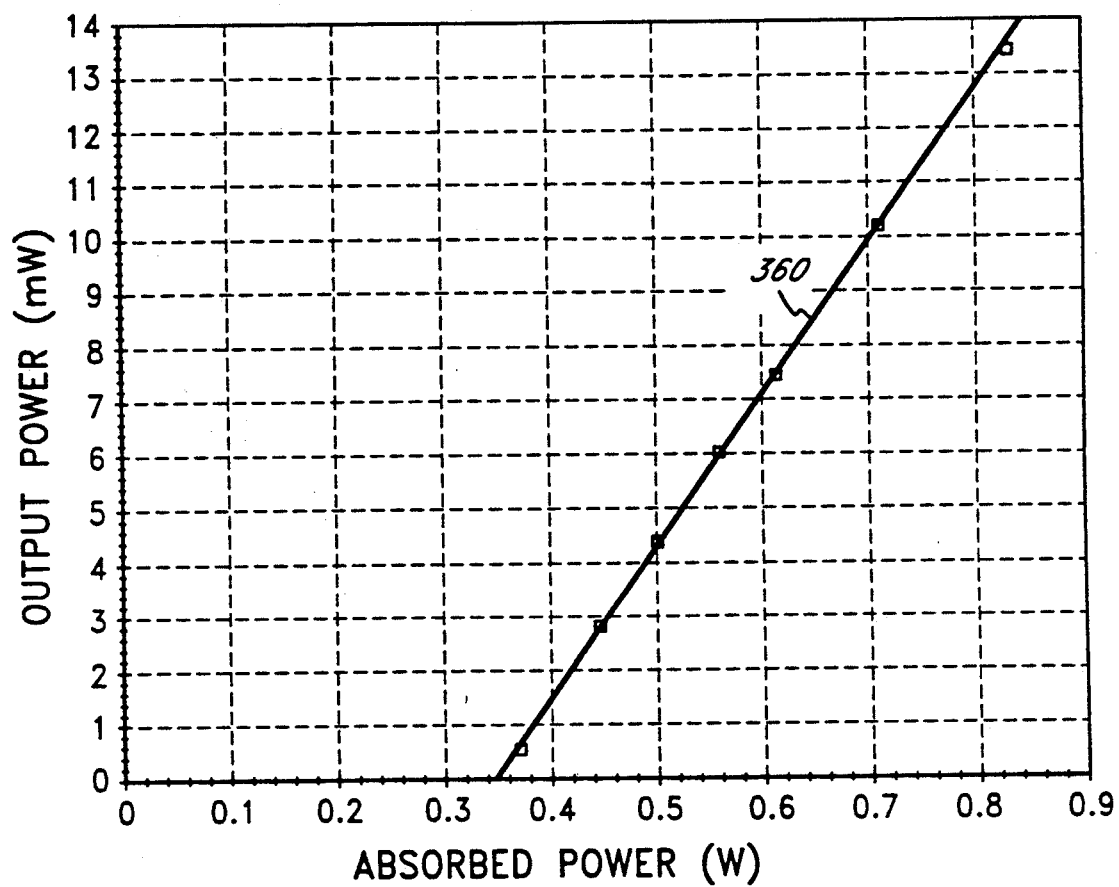
FIG. 7 shows the measured output power of the laser of FIG. 1 as a function of the pump power launched into the optical fiber of FIG. 1 when the Bragg cell operates without sweep.

Reference is now made to FIG. 7 which shows the measured output power of the laser of FIG. 1 as a function of the pump power launched into the optical fiber 110 with the Bragg cell on. In this configuration, the Erbium-doped fiber has a length of 5 meters, a concentration of dopant on the order of a few hundreds ppm. The input end mirror has a reflectivity of 4% and there is no mirror at the output end of the optical fiber 110. The graph of FIG. 7 is to be compared with the graph of FIG. 4a wherein the Bragg cell is not turned on. The curve 360 of FIG. 7 does not exhibit the gradual curved form near threshold that is typical of ASE sources unlike the curve 300 of FIG. 4a. The curve 360 is more similar to the straight line relationship of a resonant laser structure as shown in FIG. 4b. The slope efficiency of the curve 360 for this configuration is much higher than demonstrated by an ASE source and can produce higher output powers for any given high pump power. At the maximum power of the pump source, relatively high output power levels can be produced, on the order of 15 mW.

Figure 8:
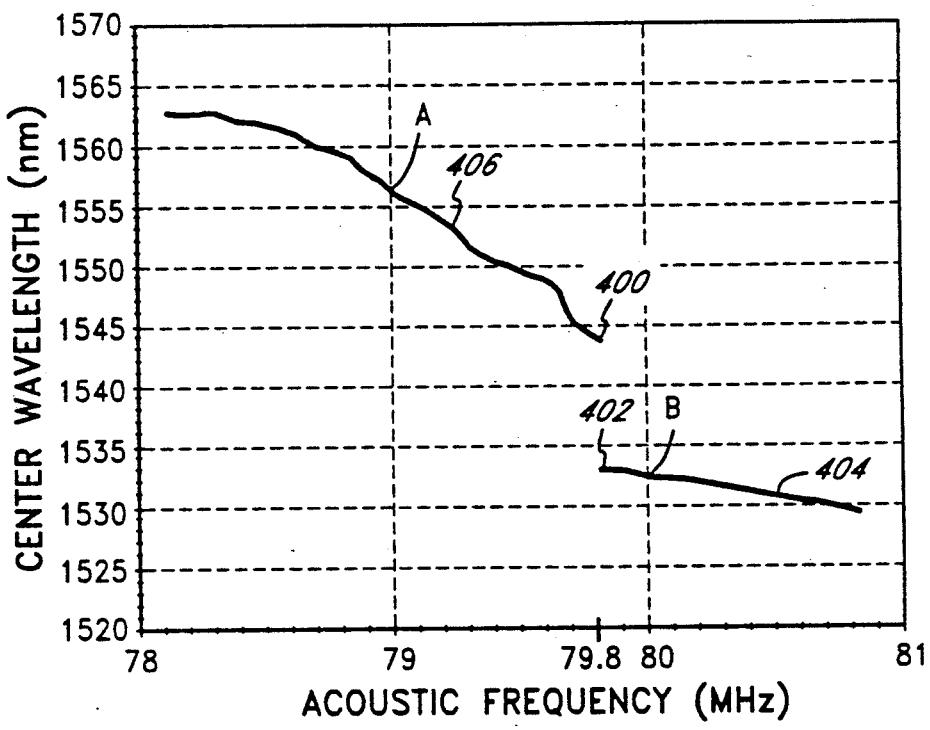
FIG. 8 represents a plot of the peak wavelength of the output beam of the fiber laser of FIG. 1 (vertical axis) as a function of the acoustic frequency of the Bragg cell (horizontal axis) when the Bragg cell operates without sweep.

Reference is now made to FIG. 8 which represents a plot of the peak wavelength of the output beam 148 (vertical axis) as a function of the acoustic frequency of the Bragg cell (horizontal axis). Around 79.8 MHz, the laser spectrum consists of two lines, one at $\lambda = 1.543$ μm represented by the numeral 400 and the other at $\lambda = 1.533$ μm represented by the numeral 402. This suggests that the two line peaks are inhomogeneously broadened with respect to one another. The fact that the laser continues to oscillate in both lines in this region indicates that the estimated optical bandwidth of the Bragg cell 140 of 10.8 nm is consistent. The two peaks are 10 nm apart and are preferably both in the passband of the acousto-optic modulator 140. If the optical bandwidth were less, the laser may cease oscillation for some acoustic frequency band or produce laser lines closer together for that frequency passband. If the optical bandwidth were larger, the peaks may be further apart since both lines have higher gain elsewhere, as illustrated in the fluorescence spectrum of FIG. 2. The person skilled in the art will recognize that the optical width of the tuning system acts as a window allowing one, two or no lines of the spectrum of the Erbium-doped optical fiber to be fed back into the fiber on each round trip or to see enough gain in a round trip in order to produce lasing action. If the optical width of the acousto-optic modulator is greater than the difference between the two peaks, the laser could oscillate at both peak wavelengths for numerous values of the acoustic frequency.

When the acoustic frequency of the Bragg cell is varied around 80 MHz, for example, when the acoustic frequency increases to values greater than 80 MHz, the peak wavelength of the output beam decreases, yielding descending curve 404 for the peak wavelength at around 1530 nm and descending curve 406 for the peak at around 1550 nm. When the acoustic frequency continues its increase, the portion of the curve 406 disappears as it is now outside the passband of the acousto-optic modulator 140 which is 10.8 nm in the embodiment shown in FIG. 1. Since the two peaks are 10 nm apart, the rightmost portion of the curve 406 exists as long as it is in the passband of the acousto-optic modulator (i.e. for an additional 0.8 nm). Similarly, when the acoustic frequency decreases, the portion of the curve 404 disappears as it is now outside the passband of the acousto-optic modulator 140 which is 10.8 nm in the embodiment shown in FIG. 1. Since the two peaks are 10 nm apart, the leftmost portion of the curve 408 exists as long as it is in the passband of the acoustooptic modulator (i.e. for an additional 0.8 nm).

Each laser peak measures only between 0.3 and 1 nm in width for 1530 nm and for 1550 nm, depending on the power output, for all acoustic frequencies (when lasing occurs), which suggests that each line is mostly homogeneously broadened with respect to other wavelengths within the same line. The tuning ranges demonstrated are from 1529.6 nm to 1533.3 nm and from 1543.8 nm to 1563.0 nm. In other embodiments of the present invention, these ranges can be extended considerably by adding a mirror on the fiber input end, by changing to a more efficient acousto-optic modulator (which requires higher power capabilities or greater modulation efficiency), or by increasing the gain with more pump power or pump power in a more efficient pump band of Erbium (such as $\lambda = 1.49$ $\mu$m). FIG. 8 indicates that a modulator frequency change of only 1 MHz can change the laser wavelength by 15 nm.

Reference is now made to FIGS. 11a–11c which are graphs of the spectrum of the output power for various values of the acoustic frequency of the Bragg cell. In FIG. 11a, the acoustic frequency is 79.0 MHz. The peak wavelength as indicated in FIG. 8 by the letter A is thus approximately 1556.4 nm. The linewidth of the peak at 1552 nm is approximately 0.5 nm.

In FIG. 11b, the acoustic frequency of the Bragg cell is selected to be 79.8 MHz. This corresponds to the points labelled by the numerals 400 and 402 in FIG. 8. Two peak wavelengths are thus possible in this configuration, one at 1543.5 nm and the other at 1533.1 nm. These two peak wavelengths are visible in the spectrum 414 of FIG. 11b. The linewidth at the leftmost peak is approximately 1 nm. At the rightmost peak, the linewidth is slightly less than 0.8 nm.

The spectrum 416 of FIG. 11c corresponds to the curve 404 in FIG. 8. The acoustic frequency is selected to be 80 MHz. This is indicated by the point B in FIG. 8. The leftmost peak at 1532.5 nm is clearly dominant. The linewidth at the 1532.5 nm peak is on the order of 0.7 nm.

It can thus be noted that when the Bragg cell is on without sweeping, the laser of FIG. 1 can be electronically tuned across the Erbium fluorescence line by varying the acoustic frequency of the Bragg cell 140 without requiring any mechanical adjustments. One peak wavelength only can be selected (rightmost or leftmost portions of the curve of FIG. 8). For an acoustic frequency properly selected, the laser peaks within both spectral lines can be produced (center portion of the curve of FIG. 8, around 79.8 MHz for the acoustic frequency). Furthermore, it should be noted that in a fiber laser comprising a Bragg cell, the discrete cavity modes are removed, thereby reducing coherent beating. However, in the foregoing, the linewidth remains substantially narrow and makes this type of source inadequate for certain applications that require broader bandwidths (such as rotation sensors).

Figure 9:
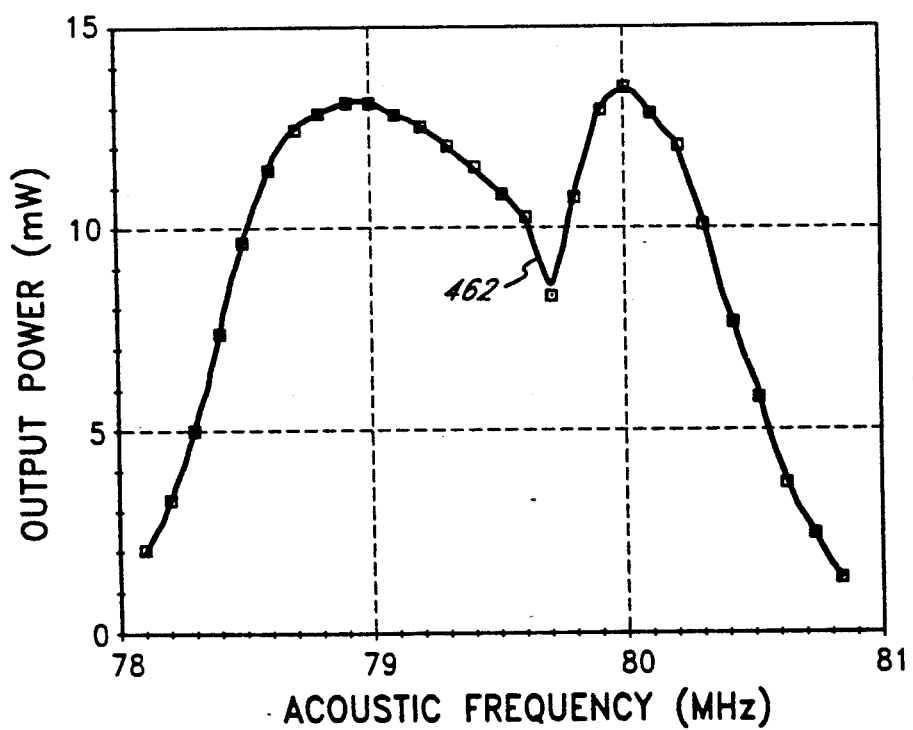
FIG. 9 shows a plot of the laser output power as a function of the acoustic frequency.

Reference is now made to FIG. 9 that shows a plot of the laser output as a function of the acoustic frequency. The output power is maximum for two ranges of frequencies, around 79 MHz and around 80 MHz. The output power dips as the tuning system passband passes through the higher loss fluorescence dip region shown in FIG. 2. This dip is indicated by the numeral 462.

Figure 10:
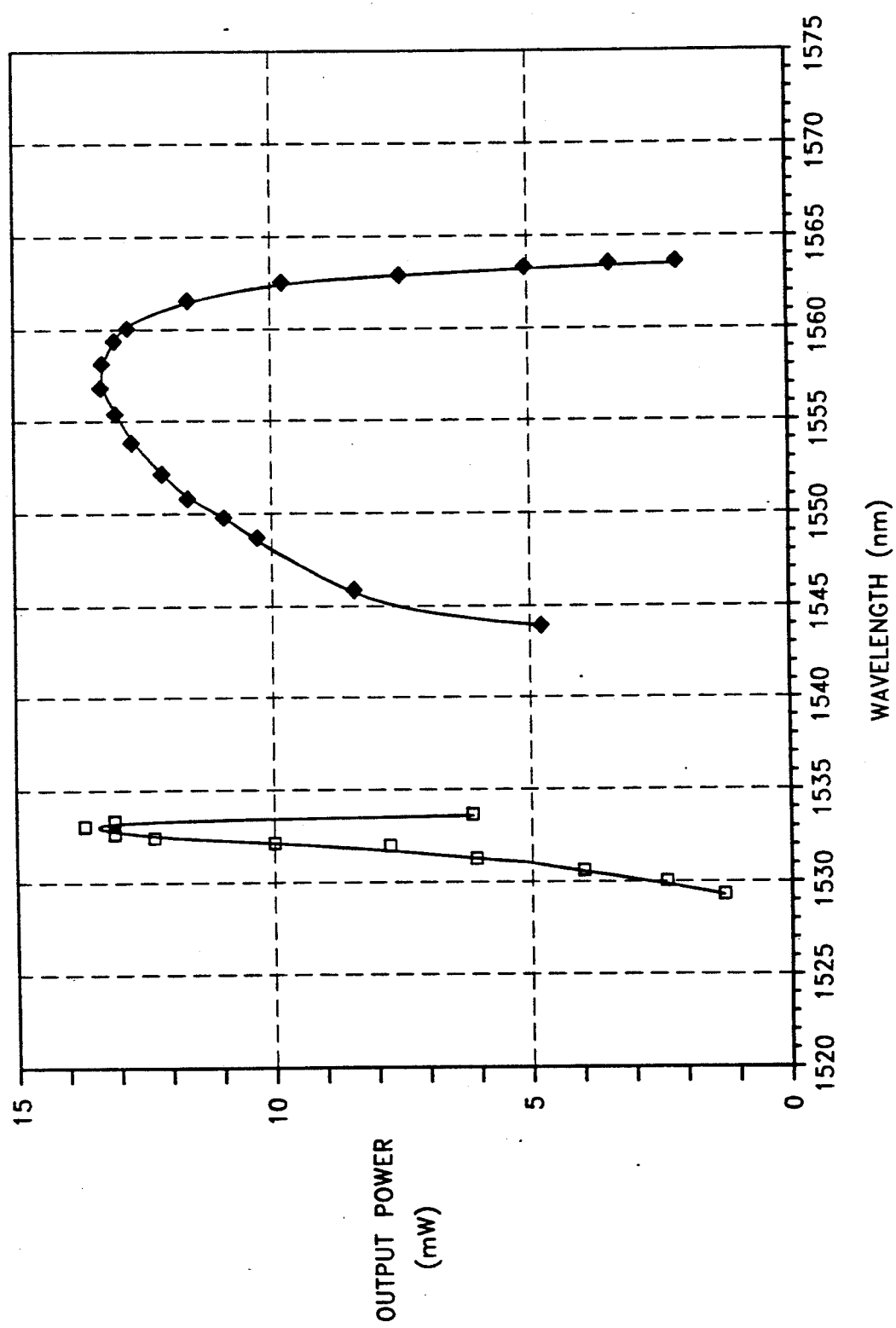
FIG. 10 illustrates a tuning curve in accordance with the present invention.

A combination of the data from FIGS. 8 and 9 produces the tuning curve shown in FIG. 10. The left line peak power of 13.5 mW occurs at 1532.6 nm with a half power width of only 0.7 nm while the right line peak power of 13.2 mW occurs near 1557.5 nm with a comparable half power width of about 0.5 nm.

Mode of Operation With the Bragg Cell and With Sweeping

In this mode of operation, the Bragg cell is on in the same conditions as explained above. However, in addition to the variable frequency source used previously for driving the acousto-optic modulator, a sweep waveform is also used to frequency modulate the carrier signal used to drive the acousto-optic modulator. In the embodiment shown in FIG. 1, the sweep waveform is a 200 Hz sinusoidal waveform. The amplitude of the sweep waveform produces a maximum frequency deviation of 0.55 MHz from the center frequency while the center frequency can be tuned in either direction between 78.7 MHz and 80.9 MHz.

Figure 12:
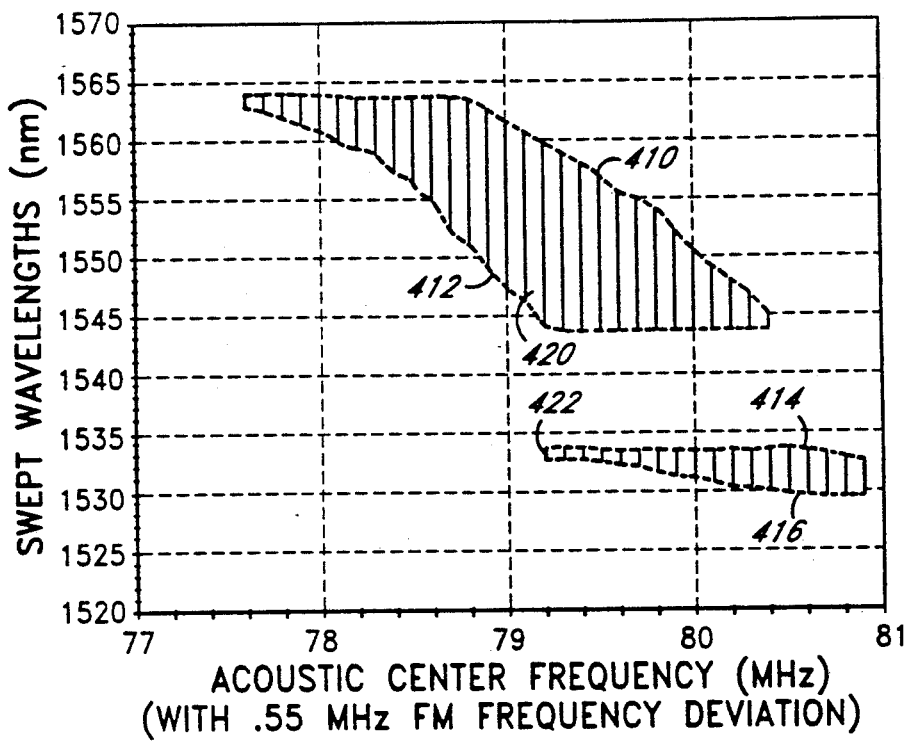
FIG. 12 represents a plot of the swept wavelengths as a function of Bragg cell frequency when the Bragg cell operates with sweep.

Reference is now made to FIG. 12 which represents a plot of the swept wavelengths as a function of Bragg cell frequency. The curves 410, 412 plotted in FIG. 12 delimit the upper sweeping range and the lower sweeping range for the 1550 nm peak. Similarly, the curves 414 and 416 delimit the upper sweeping range and the lower sweeping range for the 1530 nm peak. Delineated between these curves are vertical lines which define the optical spectral width generated by the frequency-modulation described above at various center frequencies. For example, with a center frequency of 79.2 MHz, an output beam can be produced over the entire spectral range from $\lambda = 1543.7$ nm to $\lambda = 1559.5$ nm for a width of 15.8 nm as well as a residual small peak at the other Erbium fluorescent peak at $\lambda = 1533.3$ nm. The vertical line at the center frequency of 79.2 MHz is indicated by the numeral 420. The residual small peak at the other Erbium fluorescent peak is represented by the numeral 422.

Figure 13A:
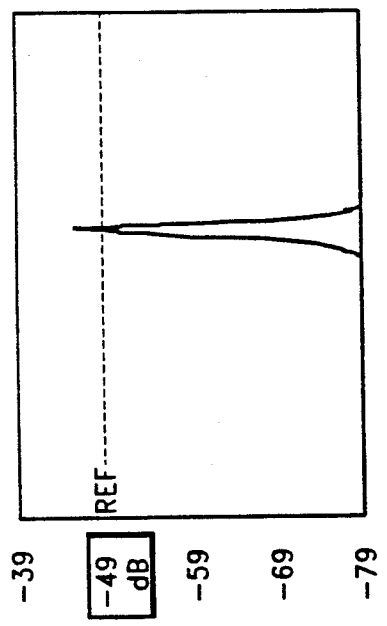
FIG. 13a shows the spectrum of the output power for an Erbium-doped fiber laser of 5 meters of length and 250 ppm of dopant and for an acoustic frequency of 79.3 MHz.
Figure 13B:
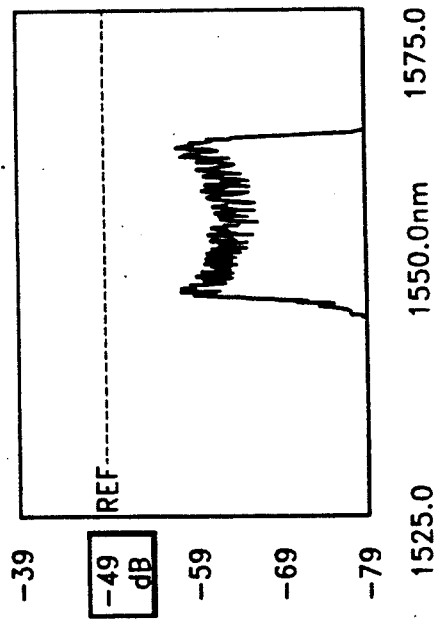
FIG. 13b represents the spectrum for the same configuration as in FIG. 13a, with the exception that the Bragg cell is now driven with an additional sinusoidal sweeping waveform at 200 Hz sweep and a maximum deviation of 0.55 MHz about the center frequency.

The spectral broadening due to the sweeping waveform is best exemplified in FIGS. 13a and 13b. FIG. 13a shows the spectrum of the output power for an Erbium-doped fiber laser of 5 meters of length and 250 ppm of dopant. The acoustic frequency selected in FIG. 13a is 79.1 MHz. FIG. 13a is comparable to FIG. 11a wherein the acoustic frequency was selected at 79.1 MHz. The spectrum of FIG. 13a exhibits a peak wavelength at approximately 1557 nm. The linewidth is relatively narrow, on the order of 1.5 nm.

In FIG. 13b, there is represented the spectrum for the same configuration as in FIG. 13a, with the exception that the Bragg cell is now driven with an additional sinusoidal sweeping waveform at 200 Hz sweep and a maximum deviation of 0.55 MHz about the center frequency. This additional sweeping waveform broadens the bandwidth to yield a linewidth on the order of 15 nm. The fiber laser of FIG. 1 in this configuration now meets the requirements of certain applications wherein the source preferably has peak wavelength emission with a linewidth greater or equal to 15 nm.

Figure 14:
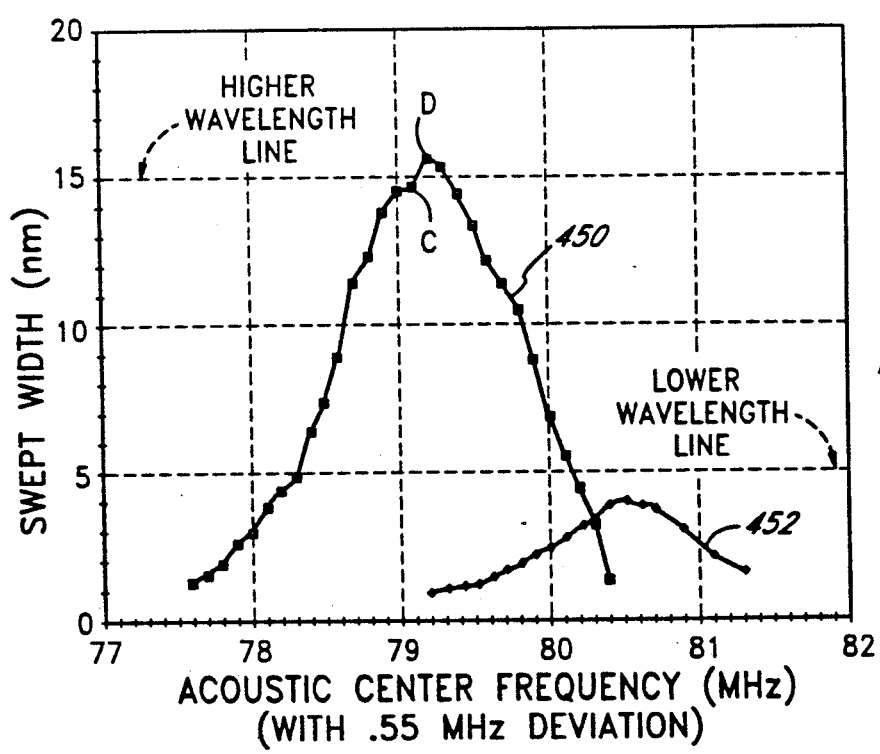
FIG. 14 represents a plot of the spectral width of the output beam (vertical scale) as a function of the Bragg cell center frequency (horizontal scale) with 0.55 MHz deviation and 200 Hz sweep.

Reference is now made to FIG. 14 which represents a plot of the spectral width of the output beam (vertical scale) as a function of the Bragg cell center frequency (horizontal scale) with 0.55 MHz deviation and 200 Hz sweep. Two curves are plotted in FIG. 14, one corresponding to the higher wavelength line (around 1550 nm), indicated by the numeral 450 and the other one corresponding to the lower wavelength line (around 1530 nm), indicated by the numeral 452. In accordance with the results given above in connection with the description of FIGS. 13a–13b, the width of 15 nm is indeed the peak width seen at the center frequency of 79.1 MHz of the Bragg cell for this amount of frequency deviation (0.55 MHz). The peak width obtained thereby is indicated by the letter C. The larger width obtained is approximately 16 nm for the center frequency 79.2 MHz (point C). The curve 452 indicates that the spectral widths obtained for the lower wavelength are substantially lower, in the range 1–4 nm.

Figure 15:
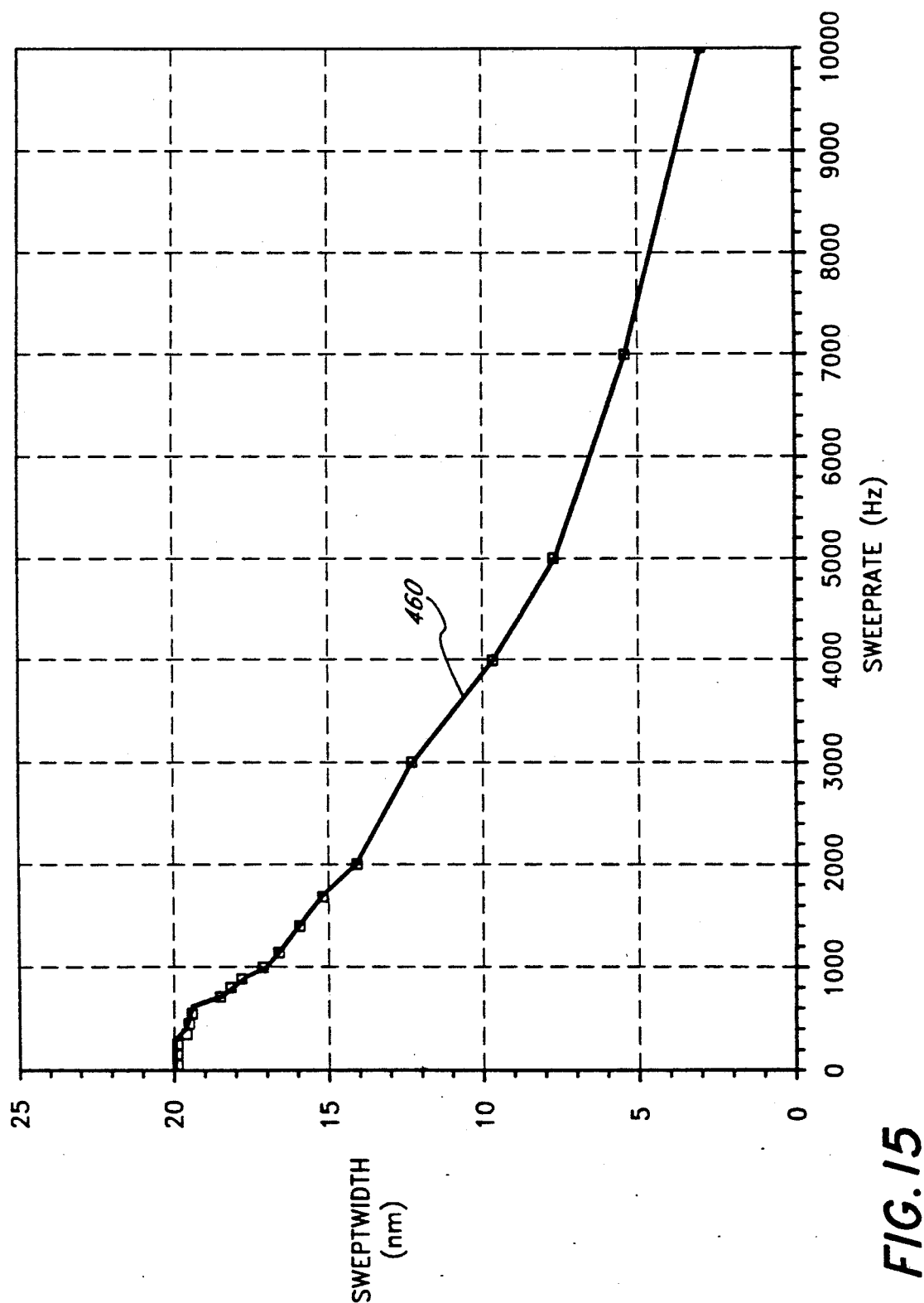
FIG. 15 represents the plot of the spectral width as a function of sweep rate with 0.85 MHz maximum deviation about 78.85 MHz.

Various sweep rates can be selected. The dynamics of the laser source of the present invention can be better understood and defined by varying the sweep rate. Using the center frequency of 78.85 MHz, the rate of frequency sweep is for example varied from 100 Hz to 10 KHz. The spectral width as a function of sweep rate is shown in FIG. 15 and is represented by the curve 460. In FIG. 15, the amplitude of the sweep waveform produces a maximum frequency deviation of 0.85 MHz. With this increased deviation, the maximum width obtained is around 19 nm for low sweep rates.

FIG. 15 shows that, as the sweep rate increases and reaches values around 10 KHz, the spectral width decreases to about 4 nm and approaches its unmodulated width of about 2 nm beyond 10 KHz at about 20 KHz (not shown in FIG. 15). In this case, the cavity is configured to produce a frequency downshift of about 160 MHz (varied slightly with sweep) or a wavelength upshift of $1.2 \times 10^{-2}$ Angström per round trip. When the acousto-optic passband is swept up in wavelength (half of each sweep cycle), the cavity can sweep energy from the previous laser line quickly in that direction. However, when the passband moves down in wavelength, the cavity sweep opposes this motion so that the only way to continue laser operation is to restart from fluorescence. A very rough estimate of the maximum sweep rate to produce the full 19 nm width can be found by calculating the time it takes to sweep energy across the entire line. In this case, during one half of the sweep cycle, 15833 passes are required to sweep across the 19 nm line. With the round trip time of 52 ns, this yields a half cycle time of 820 μs. Doubling this gives a 1.64 ms cycle leading to a maximum sweep rate of about 600 Hz, consistent with observations. Although this estimate method ignores all dynamics including multiple restarts and saturation/desaturation effects, it consistently shows good agreement with experiment in the embodiment shown in FIG. and other embodiments of the present invention (i.e., shorter fibers, larger sweep per pass, etc.). It should also be noted that for certain applications such as fiber gyroscopes, it is preferable that the frequency-modulated intracavity Bragg cell sweeps the laser spectrum across a good portion of the Erbium fluorescence line in a period shorter than the integration time of the fiber optic gyroscope. The integration time of gyroscopes is determined by the detection electronic components necessary for the detection of the signals propagated by the gyroscope. Typically, the integration time of the detection electronics is in the range of a few ms, and possibly up to 1 s. If the laser spectrum of the Erbium-doped fiber is swept in a period shorter than the integration time of the detection electronics, the instantaneous narrow-lined spectrum emitted by the fiber and swept by the Bragg cell will appear as a broad spectrum to the gyroscope as many sweeps of the spectrum will have occurred before the integration is completed. For example, if the sweep frequency is 1 KHz and the integration time of the detection electronics is 10 ms, the Bragg cell sweeps the spectrum 10 times by the time the integration of the detection electronics is completed. Even though the output spectrum emitted by the Erbium-doped fiber 110 is narrow-lined, it looks like a broad spectrum to the gyroscope after it has been swept 10 times as shown above.

The person skilled in the art will recognize that the embodiment of FIG. 1 is only exemplary and only described as a demonstration of the frequency-modulated, frequency-swept cavity concept of the present invention. Other embodiments of the present invention may comprise a more efficient Bragg deflector, a good dichroic mirror for the input fiber end, a curved feedback mirror which increases the bandwidth, a narrower linewidth tuning system, a pump laser in a more efficient Erbium pump band. These improved elements of the embodiments of the present invention and a larger frequency deviation may all help produce a wider sweep range, higher power and a different spectral shape. The dynamics of this cavity can be quite complex, exhibiting amplitude modulation and oscillations that change with different parts of the sweep cycle and vary with sweep rate.

Thus, the sweeping of the Erbium line in silica with a frequency modulated acousto-optic modulator inside a laser cavity can produce a large spectral width when measured on a long time scale compared to the sweep period. This novel source is promising for use in fiber-optic gyroscopes because it should exhibit much reduced temporal coherence while maintaining the spatial coherence and high power required for coupling into the gyroscope. For example in the embodiment of FIG. 1 described above, a spectral width of 19 nm is obtained with a sweep rate of 200 Hz and 0.85 MHz maximum deviation.

Figure 16:
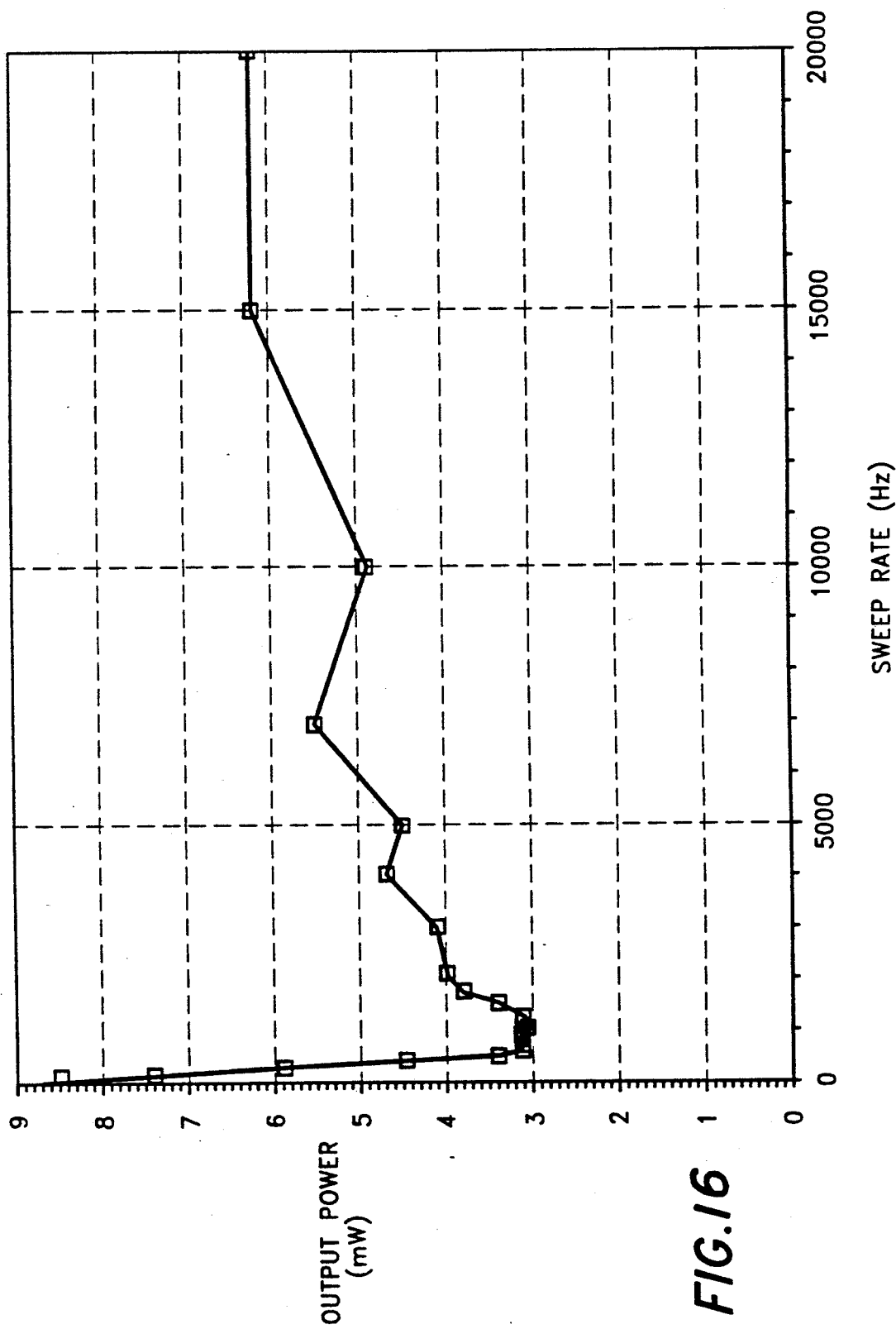
FIG. 16 shows a plot of the output power in mW as a function of the sweep rate (in Hz)

Reference is now made to FIG. 16 which shows a plot of the output power in mW as a function of the sweep rate (in Hz). The amplitude of the sweep frequency produces a maximum deviation of 0.85 MHz about the center frequency of 78.85 MHz. As indicated in connection with the description of FIG. 15, the output power dips at around 1 KHz to plateau at about 6 mW for sweep rates greater than 15 KHz. The output power reaches a maximum of 9 mW for very low sweep rates (on the order of 50 Hz).

The optical fiber laser of the present invention has numerous advantages over the previously known broadband sources such as superluminescent diodes. One of the problems associated with superluminescent diodes is that the optical energy output is not well-directed. Thus, it is difficult to capture a large percentage of the light output from the superluminescent diode and provide it as an input to a rotation sensor, or the like. In contrast, the light output from the optical fiber 110 of FIG. 1 is highly directional and substantially all of the light emitted from the optical fiber laser 110 can be provided as an input to a rotation sensor, for example.

The optical fiber 110 of FIG. 1 also has advantages over the superfluorescent fiber lasers such as the laser described in U.S. Pat. No. 4,637,025. This patent is hereby incorporated by reference herein. The resonant cavity of the present invention allows the lasing effect to occur at a considerable lower absorbed input pump threshold than occurs for the superfluorescent laser. Thus, the optical output power is considerably greater than for a superfluorescent laser using a similar lasing fiber.

Figure 17:
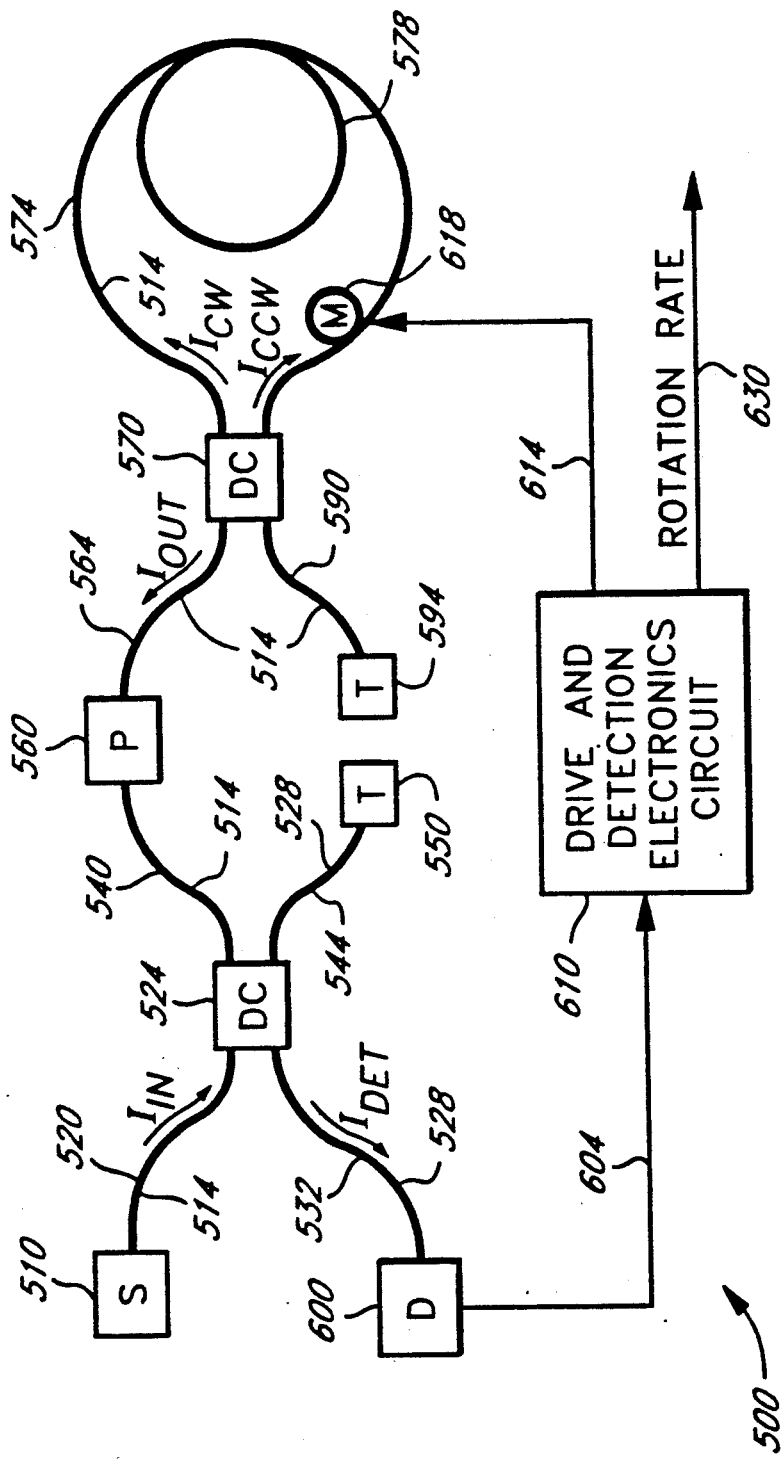
FIG. 17 represents an exemplary rotation sensor using the fiber laser of the present invention.

The fiber laser of the present invention is particularly useful as a broadband optical source for an optical fiber rotation sensor. An exemplary rotation sensor 500 that can be advantageously used in combination with the laser of the present invention is illustrated in FIG. 17. The rotation sensor 500 comprises a Sagnac interferometer which includes a light source (S) 510 which provides an optical input signal $I_{IN}$, represented by an arrow. The light source (S) is advantageously the fiber laser of the present invention, for example the embodiment of FIG. 1. The input signal $I_{IN}$ is coupled to a first optical fiber 514 which is preferably a single-mode birefringent optical fiber. The first optical fiber 514 includes a first optical fiber segment 520 that serves as the input to the rotation sensor 500. The first optical fiber segment 520 provides a propagation path to a first optical directional coupler (DC) 524, which, in preferred embodiments of the rotation sensor 500, is constructed by juxtaposing two fibers. Details of such a coupler are disclosed in U.S. Pat. Nos. 4,493,528; 4,536,058; 4,564,262;and 4,601,541. These patents incorporated by reference herein. Those skilled in the art will appreciate that integrated optical couplers may also be utilized.

As set forth in the referenced patents, the first optical fiber segment 520 is connected to one port of the first directional coupler 524. The first directional coupler 524 is formed by juxtaposing a second optical fiber 528 with first optical fiber 514. The second optical fiber 528 is also advantageously a birefringent single-mode optical fiber. The second optical fiber 528 includes a second optical fiber segment 532 connected to an adjacent port of the first directional coupler 524.

The first directional coupler 524 has two additional ports, one of which is connected to a third optical fiber segment 540 and the other of which is connected to a fourth optical fiber segment 544.

In preferred embodiments of the rotation sensor 500, the first directional coupler 524 is constructed so that approximately 50% of the optical energy propagating in the first optical fiber segment 520 from the light source 510 towards the first directional coupler 524 is directly transmitted to the third optical fiber segment 540 and approximately 50% of the optical energy is coupled to the fourth optical fiber segment 544. It should be understood that the first directional coupler 524 is bidirectional in that optical energy propagating in the third optical fiber segment 540 toward the first directional coupler 524 is divided substantially equally between the first optical fiber segment 520 and the second optical fiber segment 528.

The fourth optical fiber segment 544 is terminated by a first light-absorbing terminator (T) 550. The first light-absorbing terminator 550 absorbs substantially all the optical energy incident on it from the fourth optical fiber segment 544 so that substantially no light is reflected back towards the first directional coupler 524.

The third optical fiber segment 540 provides a propagation path from the first directional coupler 524 to a polarizer (P) 560. Those skilled in the art will recognize that the polarizer is advantageous in that it reduces certain types of phase errors. If no polarizer is used, reduction of phase errors may be achieved through use of unpolarized light, as described in U.S. Pat. No. 4,529,312 and U.S. Pat. No. 4,634,282. These patents are hereby incorporated by reference herein. The polarizer can be constructed in accordance with a number of different embodiments, and is advantageously constructed in accordance with U.S. Pat. No. 4,386,822. This patent is hereby incorporated by reference herein. The polarizer 560 is further connected to a fifth optical fiber segment 564 such that light incident to the polarizer 560 from the third optical fiber segment 540 is output from the polarizer 560 on the fifth optical fiber segment 564. As is known to one skilled in the art, a single-mode optical fiber, such as the first optical fiber 514, typically propagates light in first and second orthogonal polarization modes. The polarizer 560 operates to block the light in one of the two polarization modes (e.g., the second polarization mode) so that the light propagating in the fifth optical fiber segment 564 away from the polarizer 560 comprises light in substantially only the first polarization modes (i.e., polarized light).

The polarized light from the polarizer 560 propagates via the fifth optical fiber segment 564 to a port of a second directional coupler (DC) 570. The second directional coupler 570 couples the light to a sixth optical fiber segment 574 of the first optical fiber 514. The sixth optical fiber segment 574 is formed into a loop 578 which lies in a plane generally perpendicular to the axis around which the loop is to be rotated. The sixth optical fiber segment 574 returns to an adjacent port of the second directional coupler 570 which thus closes the loop 578. The first optical fiber 514 extends from the second directional coupler 570 to form a seventh optical fiber segment 590. The seventh optical fiber segment 590 is terminated by a second light-absorbing terminator (T), an optical detector (D) 600 which detects the intensity of the optical energy in the second optical fiber segment 528 and thus detects the intensity of the combined optical energy from the loop 578. The detector 600 provides an electrical output signal on a line 604 that is responsive to the detected intensity. As is well known in the art, the intensity of the combined optical energy from the loop 578 depends upon the relative phases of the two counterpropagating optical signals, which in turn depends in part upon the rotation rate of the loop 578.

Various apparatuses and techniques for converting the detected optical intensity to an output signal representing the magnitude and angular direction of rotation are disclosed in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. For example, a drive and detection electronics circuit block 610 is illustrated. The drive and detection electronics circuit block 610 provides an electrical output signal on a line 614 which is coupled to a phase modulator (M) 618. The phase modulator 618 is coupled to the sixth optical fiber segment 574 at a position offset from the center of the loop 578. The drive and detection electronics circuit block 610 drives the phase modulator 618 with a specific frequency that is selected to modulate the phase of the two counterpropagating optical signals $I_{CW}$ and $I_{CCW}$. The drive and detection electronics circuit block 610 further uses the specific frequency to synchronously demodulate the electrical representation of the optical output signal on the line 604 to provide an electrical output signal on a line 630 that represents the rotation rate of the loop 578. Additional details of the operation of the rotation sensor can be found in the aforementioned U.S. Pat. No. 4,410,275; U.S. Pat. No. 4,456,377; U.S. Pat. No. 4,487,330; U.S. Pat. No. 4,634,282; and U.S. Pat. No. 4,637,722. These patents are hereby incorporated by reference herein. While the rotation sensor depicted in FIG. 17 is in closed loop configuration, it will be understood that other configurations, such as described in U.S. Pat. No. 4,779,975 may be utilized. This patent is hereby incorporated by reference herein.

Various embodiments of a broadband optical fiber laser source have been described above. Although the invention has been described with reference to these specific embodiment, the descriptions have been illustrative of the invention and are not intended to be limiting. In particular, the fiber laser of the laser of the present invention can be doped with any other rare-earth suitable material. Additionally, an acousto-optic modulator has been described in the preferred embodiment of the present invention. The person skilled in the art will recognize that the acousto-optic modulator can be replaced by a frequency shifter that upshifts or downshifts the output light emitted by the doped optical fiber upon traverse of the frequency shifter. Ideally, an all-fiber frequency shifter can be used, making the device of the present invention an all-fiber source. Furthermore, the device and the method of the present invention can be considered in the context of non optical fiber implementations, such as semiconductor lasers. Various other modifications and applications may occur to those skilled in the art without departing from the true spirit and scope of the invention as defined in the appended claims.

We claim:

1. A broadband laser source having a source optical spectrum with a source linewidth, comprising:
   a resonant cavity having a waveguide comprising a medium which emits radiation in an emission spectrum comprising optical energy in a continuum of frequencies, in response to application of pump energy to said lasing medium said radiation having an emission linewidth that is significantly narrower than said source linewidth;
   a source of pump energy for producing said optical energy; and
   a frequency modulator having an optical passband which frequency shifts radiation passing through said resonant cavity, within said optical passband, said optical passband being narrower than said source linewidth and being sufficiently wide to encompass at least a substantial portion of the continuum of frequencies, said modulator repetitively shifting the continuum of frequencies within the passband as radiation passes repetitively through said cavity, said modulator varying said passband to shift said continuum of frequencies within the passband from one side of said source optical spectrum to the other to provide said source linewidth, the passband being varied at a rate which is sufficiently slow to permit the repetitively shifted continuum of frequencies to substantially continuously remain within the varying passband as said continuum of frequencies is shifted from one side of the source optical spectrum to the other.

2. A broadband laser source as claimed in claim 1, wherein said source of pump energy is a laser diode.

3. A broadband laser source as claimed in claim 1, wherein said waveguide comprises a single-mode fiber doped with lasing material.

4. A broadband laser source as claimed in claim 3, wherein said lasing medium includes a homogeneously broadened lasing material.

5. A broadband laser source as claimed in claim 3, wherein said lasing medium includes a inhomogeneously broadened lasing material.

6. A broadband laser source as claimed in claim 4, wherein said lasing medium includes Erbium.

7. A broadband laser source as claimed in claim 1, wherein said cavity is formed by an optical fiber having first and second ends and having a reflector positioned adjacent to said first end of said optical fiber.

8. A broadband laser source as claimed in claim 1, wherein said frequency modulator comprises an acousto-optic modulator producing an acoustic signal at a predetermined acoustic frequency, said acousto-optic modulator being further connected to a signal source which produces a signal having a waveform for modulating said acoustic signal in accordance with said waveform.

9. A broadband laser source as claimed in claim 8, wherein said frequency modulator further comprises a reflector for substantially reflecting said radiation emitted by said lasing medium and feeding back said reflected radiation via said acousto-optic modulator into said lasing medium.

10. A broadband laser source as claimed in claim 9, wherein said reflector is a flat feedback mirror or a curved feedback mirror.

11. A broadband laser source as claimed in claim 8, wherein the acoustic frequency of said acoustic signal is approximately 80 MHz.

12. A broadband laser source as claimed in claim 8, wherein said acoustic-optic modulator is a Bragg cell deflector.

13. A broadband laser source as claimed in claim 1, wherein a portion of said radiation emitted by said lasing medium is unaffected by said frequency modulator and another portion of said radiation is deflected by said frequency modulator so that said other portion is sent back to said lasing medium for further amplification in said lasing medium.

14. A broadband laser source as claimed in claim 1, further comprising an objective for focusing the radiation emitted by said lasing medium, said objective being positioned to receive optical energy from the first end of the fiber.

15. A broadband laser source, comprising:
   a resonant cavity having a lasing medium which emits radiation in an emission spectrum in response to application of pump energy to said lasing medium;
   a source of pump energy for producing said pump energy; and
   a frequency modulator in said cavity, said frequency modulator further comprising a frequency shifter for shifting the frequency of said radiation by a predetermined frequency and a frequency sweeper for modulating said frequency shifter, wherein said cavity is formed by an optical fiber having first and second ends and having at least a reflector positioned near said first end of said optical fiber and wherein said reflector is substantially reflective to said emitted radiation and substantially transmissive to said pump light.

16. A broadband laser source, comprising:
   a resonant cavity having a lasing medium which emits radiation in an emission spectrum in response to application of pump energy to said lasing medium;
   a source of pump energy for producing said pump energy; and
   a frequency modulator in said cavity, said frequency modulator further comprising a frequency shifter for shifting the frequency of said radiation by a predetermined frequency and a frequency sweeper for modulating said frequency shifter, wherein said cavity is formed by an optical fiber having first and second ends and having at least a reflector positioned near said first end of said optical fiber and wherein said reflector is substantially transmissive to said emitted radiation and substantially reflective to said pump light.

17. A broadband laser source, comprising:
a resonant cavity having a lasing medium which emits radiation in an emission spectrum in response to application of pump energy to said lasing medium;
a source of pump energy for producing said pump energy; and
a frequency modulator in said cavity, said frequency modulator further comprising a frequency shifter for shifting the frequency of said radiation by a predetermined frequency and a frequency sweeper for modulating said frequency shifter, wherein said frequency modulator comprises an acousto-optic modulator which produces an acoustic signal at a predetermined acoustic frequency, said acoustic-optic modulator being connected to a signal source which produces a signal having a sinusoidal sweep waveform, said signal modulating said acoustic signal in accordance with said sinusoidal sweep waveform.

18. A broadband laser source, comprising:
a resonant cavity having a lasing medium which emits radiation in an emission spectrum in response to application of pump energy to said lasing medium;
a source of pump energy for producing said pump energy; and
a frequency modulator in said cavity, said frequency modulator further comprising a frequency shifter for shifting the frequency of said radiation by a predetermined frequency and a frequency sweeper for modulating said frequency shifter, wherein said frequency modulator comprises an acousto-optic modulator producing an acoustic signal at a predetermined acoustic frequency, said acoustic-optic modulator being further connected a signal source which produces a signal having a triangular sweep waveform, said signal modulating said acoustic signal in accordance with said triangular sweep waveform.

19. A broadband laser source, comprising:
a resonant cavity having a lasing medium which emits radiation in an emission spectrum in response to application of pump energy to said lasing medium;
a source of pump energy for producing said pump energy; and
a frequency modulator in said cavity, said frequency modulator further comprising a frequency shifter for shifting the frequency of said radiation by a predetermined frequency and a frequency sweeper for modulating said frequency shifter, wherein said frequency modulator comprises an acousto-optic modulator producing an acoustic signal at a predetermined acoustic frequency, said acoustic-optic modulator being further connected to a signal source which produces a signal having a sawtooth sweep waveform, said signal modulating said acoustic signal in accordance with said sawtooth sweep waveform.

20. A broadband laser source, comprising:
a resonant cavity having a lasing medium which emits radiation in an emission spectrum in response to application of pump energy to said lasing medium;
a source of pump energy for producing said pump energy; and
a frequency modulator in said cavity, said frequency modulator further comprising a frequency shifter for shifting the frequency of said radiation by a predetermined frequency and a frequency sweeper for modulating said frequency shifter, wherein said frequency modulator comprises an acousto-optic modulator producing an acoustic signal at a predetermined acoustic frequency, said acoustic-optic modulator being further connected to a signal source which produces a signal having a sweep waveform, said signal modulating said acoustic signal in accordance with said sweep waveform whose rate is between 100 Hz and 10 kHz.

21. A broadband laser source as claimed in claim 20, wherein said sweep rate is approximately 1 kHz.

22. A broadband laser source, comprising:
a resonant cavity having a lasing medium which emits radiation in an emission spectrum in response to application of pump energy to said lasing medium;
a source of pump energy for producing said pump energy; and
a frequency modulator in said cavity, said frequency modulator further comprising a frequency shifter for shifting the frequency of said radiation by a predetermined frequency and a frequency sweeper for modulating said frequency shifter, wherein said cavity is formed by an optical fiber having first and second ends and having at least a reflector positioned to receive optical energy from said first end of said optical fiber and wherein said reflector is a dichroic mirror.

23. A broadband laser source, comprising:
a resonant cavity having a lasing medium which emits radiation in an emission spectrum in response to application of pump energy to said lasing medium;
a source of pump energy for producing said pump energy; and
a frequency modulator in said cavity, said frequency modulator further comprising a frequency shifter for shifting the frequency of said radiation by a predetermined frequency and a frequency sweeper for modulating said frequency shifter and wherein said emission spectrum comprises at least two consecutive lines of emission, wherein said frequency shifter has an optical bandwidth and wherein the optical bandwidth of the frequency shifter is greater than the distance between said two consecutive lines of the emission spectrum of said lasing medium.

24. A broadband laser source as claimed in claim 23, wherein said optical bandwidth of said shifter is approximately 10.8 nm.

25. An apparatus, comprising:
an interferometer; and
a broadband laser source, comprising:
a resonant cavity having a lasing medium which emits radiation in an emission spectrum in response to application of pump light to said lasing medium;
a frequency modulator in said cavity, said frequency modulator further comprising a frequency shifter for shifting the frequency of said radiation by a predetermined frequency and a frequency sweeper for modulating said frequency shifter; and
a pump light source that emits said pump light.

26. The apparatus as claimed in claim 25, wherein said interferometer comprises a Sagnac interferometer.

27. The apparatus as claimed in claim 25, wherein said lasing medium comprises an Erbium-doped single mode optical fiber.

28. The apparatus as claimed in claim 25, wherein said frequency modulator is a Bragg cell deflector.

29. An apparatus for tuning a homogeneously broadened emitting lasing medium, said apparatus having a source optical spectrum with a source linewidth, said apparatus comprising:
- a waveguide comprising said lasing medium, said lasing medium being responsive to pump energy at a first wavelength to cause said lasing medium to emit radiation in an emission spectrum comprising optical energy in a continuum of frequencies, said radiation having an emission linewidth that is significantly narrower than said source linewidth;
- a source of pump energy for producing said pump energy;
- a frequency modulator having an optical passband which frequency shifts radiation passing through said resonant cavity, within said optical passband, said optical passband being narrower than said source linewidth and being sufficiently wide to encompass at least a substantial portion of the continuum of frequencies, said modulator repetitively shifting the continuum of frequencies within the passband as radiation passes repetitively through said cavity, said modulator varying said passband to shift said continuum of frequencies within the passband from one side of said source optical spectrum to the other to provide said source linewidth, the passband being varied at a rate which is sufficiently slow to permit the repetitively shifted continuum of frequencies to substantially continuously remain with the varying passband as said continuum of frequencies is shifted from one side of the source optical spectrum to the other; and
- means for feeding back said frequency shifted portion of said radiation into said lasing medium.

30. An apparatus for tuning a homogeneously broadened emitting lasing medium as claimed in claim 29, wherein said frequency shifter comprises a Bragg cell deflector.

31. An apparatus for electronically tuning a laser fiber doped with lasing medium, said lasing medium having an emission spectrum, said apparatus comprising:
- a pump source for pumping said laser fiber at a first wavelength to cause said lasing medium to emit radiation at a second wavelength of said emission spectrum;
- a frequency shifter for shifting the frequency of at least a portion of said radiation at said second wavelength and for feeding back said frequency shifted portion of said radiation into said lasing medium.

32. An apparatus for electronically tuning a laser fiber doped with lasing medium as claimed in claim 31, wherein said frequency shifter comprises a Bragg cell deflector.

33. A method of broadening a narrow-lined laser source comprising the steps of:
- pumping an optical waveguide comprising a lasing medium which emits radiation in an emission spectrum comprising optical energy in a continuum of frequencies, said radiation having an emission linewidth that is significantly narrower than said source linewidth; and
- selecting a frequency modulator having an optical passband;
- frequency shifting radiation passing through said resonant cavity within said optical passband;
- selecting said optical passband so that it is narrower than said source linewidth and so that it is sufficiently wide to encompass at least a substantial portion of the continuum of frequencies;
- repetitively shifting the continuum of frequencies within the passband as radiation passes back and forth in said cavity, said modulator varying said passband to shift said continuum of frequencies within the passband from one side of said source optical spectrum to the other to provide said source linewidth; and
- varying the passband at a rate which is sufficiently slow to permit the repetitively shifted continuum of frequencies to substantially continuously remain within the varying passband as said continuum of frequencies is shifted from one side of the source optical spectrum to the other.

34. A method of broadening a narrow-lined laser source as claimed in claim 33, wherein the modulating step comprises the step of passing said radiation through a Bragg cell deflector driven by a frequency modulation source.

35. A method of tuning a homogeneously broadened emitting lasing medium comprising the steps of:
- pumping an optical waveguide comprising a lasing medium which emits radiation in an emission spectrum in response to application of pump energy to said lasing medium;
- shifting the frequency of said radiation so as to produce a continuum of frequency-chirped modes in said cavity, said frequency-chirped modes having an energy;
- sweeping said frequency at a sweeprate slow enough to shift the energy of said frequency-chirped cavity modes across said linewidth; and
- feeding back said frequency shifted portion of said radiation into said lasing medium.

36. A method of tuning a homogeneously broadened emitting lasing medium as claimed in claim 35, wherein said shifting step comprises the step of passing radiation through a Bragg cell deflector.

37. A method for electronically tuning a laser fiber doped with lasing medium emitting radiation in an emission spectrum comprising optical energy in a continuum of frequencies, said radiation having an emission linewidth that is significantly narrower than said source linewidth, said method comprising the steps of:
- pumping said laser fiber;
- frequency shifting radiation passing through said resonant cavity within said optical passband;
- selecting said optical passband so that it is narrower than said source linewidth and so that it is sufficiently wide to encompass at least a substantial portion of the continuum of frequencies;
- repetitively shifting the continuum of frequencies within the passband as radiation passes back and forth in said cavity, said modulator varying said passband to shift said continuum of frequencies within the passband from one side of said source optical spectrum to the other to provide said source linewidth;
- varying the passband at a rate which is sufficiently slow to permit the repetitively shifted continuum of frequencies to substantially continuously remain within the varying passband as said continuum of frequencies is shifted from one side of the source optical spectrum to the other; and feeding back said frequency shifted portion of said radiation into said lasing medium.

38. A method for electronically tuning a laser fiber doped with lasing medium as claimed in claim 37, wherein said shifting step comprises the step of passing radiation through a Bragg cell deflector.

39. A method of broadening a narrow-lined laser source comprising the steps of:
pumping an optical waveguide comprising a lasing medium which emits radiation in an emission spectrum in response to application of pump energy to said lasing medium;
shifting the frequency of said radiation so as to produce a continuum of frequency-chirped modes in said cavity, said frequency-chirped modes having an energy;
sweeping said frequency at a sweeprate slow enough to shift the energy of said frequency-chirped cavity modes across said linewidth.

* * * * *